(12) United States Patent
Harashina et al.

(10) Patent No.: US 7,498,368 B2
(45) Date of Patent: Mar. 3, 2009

(54) FLAME-RETARDANT RESIN COMPOSITION

(75) Inventors: Hatsuhiko Harashina, Fuji (JP); Shinya Yamada, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 388 days.

(21) Appl. No.: 10/557,199

(22) PCT Filed: May 25, 2004

(86) PCT No.: PCT/JP2004/007101

§ 371 (c)(1),
(2), (4) Date: Nov. 17, 2005

(87) PCT Pub. No.: WO2004/111131

PCT Pub. Date: Dec. 23, 2004

(65) Prior Publication Data

US 2006/0247339 A1 Nov. 2, 2006

(30) Foreign Application Priority Data

May 26, 2003 (JP) ............................. 2003-148215

(51) Int. Cl.
*C08K 5/3492* (2006.01)
*C08K 3/38* (2006.01)
*C08K 3/10* (2006.01)

(52) U.S. Cl. .................. 524/100; 524/405; 524/406; 524/417; 524/420; 524/434; 524/513

(58) Field of Classification Search .................. 524/100, 524/405, 406, 417, 420, 434, 513
See application file for complete search history.

(56) References Cited

U.S. PATENT DOCUMENTS

| 6,051,708 | A | 4/2000 | de Keijzer et al. |
| 7,115,677 | B2 * | 10/2006 | Harashina et al. ........... 523/205 |
| 2005/0148701 | A1 | 7/2005 | Harashina et al. |

FOREIGN PATENT DOCUMENTS

| JP | 8-48812 | 2/1996 |
| JP | 9-255811 | 9/1997 |
| JP | 10-511409 | 11/1998 |
| JP | 11-21434 | 1/1999 |
| JP | 2001-31847 | 2/2001 |
| JP | 2001-288361 | 10/2001 |
| JP | 2002-212432 | 7/2002 |
| JP | 2003-226818 | 8/2003 |
| WO | WO 96/16948 | 6/1996 |
| WO | 03/002665 A1 | 1/2003 |

* cited by examiner

*Primary Examiner*—Kriellion A Sanders
(74) *Attorney, Agent, or Firm*—Nixon & Vanderhye P.C.

(57) ABSTRACT

A flame-retardant resin composition comprises a base resin (e.g., a polyester-series resin), a flame retardant (A) comprising a salt of an amino group-containing triazine compound with a sulfuric acid and/or a sulfonic acid, a flame-retardant auxiliary (B). The flame-retardant auxiliary (B) includes an aromatic resin, acyclic urea-series compound or a derivative thereof [e.g., acetyleneurea, uric acid, a salt of melamine or a condensate thereof (e.g., melam, melem, and melon) with cyanuric acid], an amino group-containing triazine compound (e.g., melamine or a condensate thereof), and/or an inorganic metal-series compound (e.g., a metal salt of an oxygen acid having no sulfur atom, a metal oxide, a metal hydroxide, and a metal sulfide). The present invention provides a flame-retardant resin composition to which flame retardancy is imparted without using a halogen-series flame retardant and an organic phosphorus-series flame retardant.

35 Claims, No Drawings

FLAME-RETARDANT RESIN COMPOSITION

This application is the US national phase of international application PCT/JP20041007101 filed 25 May 2004 which designated the U.S. and claims benefit of JP 2003-148215, dated 26 May 2003, the entire content of which is hereby incorporated by reference.

TECHNICAL FIELD

The present invention relates to a flame-retardant resin composition useful for flame retardation of a thermoplastic resin such as a polyester-series resin, and a process for producing the same, and a shaped article formed from the flame-retardant resin composition.

BACKGROUND ART

A thermoplastic resin, for example a polyester-series resin, has excellent mechanical and electrical properties, weather resistance, water resistance, and resistance to chemicals and solvents. Therefore, the resin is used as an engineering plastic in various purposes such as electric or electronic device parts, mechanical device parts and automotive parts. While, the polyester-series resin is required to have improved mechanical properties and to be flame-retardant from viewpoint of safety as the field of their uses expands. As a flame retardant for generally imparting high flame-retardancy to a resin, a halogen compound or an organic phosphorus-containing compound has been known. However, a halogen-containing flame retardant is not preferable for environmental reasons because the flame retardant sometimes generates a large amount of a dioxin-series compound on resolution caused by combustion. In addition, an organic phosphorus-containing flame retardant is a causative factor of a sick house syndrome which has been a problem recently, and is not preferred from the viewpoint of safety.

On the other hand, there has been proposed a flame-retardant resin composition to which flame retardancy is imparted by using a flame retardant which is not an organic phosphorus-containing nor halogen atom-containing one. For example, Japanese Patent Application Laid-Open No. 255811/1997 (JP-9-255811A) (Patent Document 1) discloses a flame-retardant resin composition which comprises a thermoplastic resin such as a polystyrene resin, a polypropylene resin or a polyamide resin, and a reaction product of melamine and sulfuric acid as a flame retardant. Moreover, Japanese Patent Application Laid-Open No. 511409/1998 (JP-10-511409A) (Patent Document 2) discloses that a melamine condensate which is obtained from condensation of melamine or a melamine salt by using an organic acid such as sulfonic acid imparts flame retardancy to a polyamide resin, an ABS resin, and a polyurethane resin. Further, Japanese Patent Application Laid-Open No. 288361/2001 (JP-2001-288361A) (Patent Document 3) discloses a flame-retardant polyamide resin composition containing melam methanesulfonate as a flame retardant.

These flame retardants, however, cannot certainly impart enough flame retardancy to a broad variety of resins (in particular, a polyester-series resin).

Patent Document 1: JP-9-255811A
Patent Document 2: JP-10-511409A
Patent Document 3: JP-2001-288361A

DISCLOSURE OF THE INVENTION

Problems to be Solved by the Invention

It is therefore an object of the present invention to provide a resin composition which is rendered flame-retardant to a satisfactory level without using a halogen-containing flame retardant and/or an organic phosphorus-containing flame retardant, a process for producing the same.

Another object of the present invention is to provide a flame-retardant resin composition of high practical use without deteriorating characteristics of a base resin, a process for producing the same.

It is still another object of the present invention to provide a shaped article which improves flame retardancy and inhibits bleeding out, and a process for producing the same.

It is a further object of the present invention to provide a shaped article which is improved in both flame retardancy and electrical properties (e.g., tracking resistance), and a process for producing the same.

Means to Solve the Problems

The inventors of the present invention made intensive studies to achieve the above objects and finally found that the combination use of a specific flame-retardant auxiliary and a salt of an amino group-containing triazine compound with a sulfuric acid and/or a sulfonic acid imparts flame retardancy to a base resin (e.g., a thermoplastic resin) at a high level without using a halogen atom-containing or a phosphorus atom-containing flame retardant. The present invention was accomplished based on the above findings.

That is, the flame-retardant resin composition of the present invention comprises (R) a base resin, (A) a flame retardant and (B) a flame-retardant auxiliary, wherein the flame retardant (A) comprises a salt of (A1) an amino group-containing triazine compound [for example, melamine and a melamine condensate (e.g., melam, melem, and melon)] with (A2) at least one member selected from the group consisting of a sulfuric acid and a sulfonic acid (for example, an alkanesulfonic acid), and the flame-retardant auxiliary (B) comprises at least one member selected from the group consisting of (B1) an aromatic resin, (B2) acyclic urea-series compound or a derivative thereof, (B3) an amino group-containing triazine compound and (B4) an inorganic metal-series compound.

The base resin (R) may comprise at least a polyester-series resin. The base resin (R) may comprise (i) a polyester-series resin (for example, an aromatic polyester-series resin such as a homo- or copolyester having at least one unit selected from the group consisting of 1,4-cyclohexanedimethylene terephthalate, a $C_{2-4}$alkylene terephthalate, and a $C_{2-4}$alkylene naphthalate, or the like), or (ii) the polyester-series resin and a polystyrenic resin. The base resin (R) may be, for example, a poly$C_{2-4}$alkylene terephthalate (e.g., a polyethylene terephthalate (PET), a polypropylene terephthalate [(PPT), a polytrimethylene terephthalate (PTT)], and a polybutylene terephthalate (PBT)), or a modified poly$C_{2-4}$alkylene terephthalate (e.g., an isophthalic acid-modified polybutylene terephthalate), and others. Moreover, the base resin (R) may be a mixture of a plurality of $C_{2-4}$alkylene terephthalates, for example, a mixture of a first resin and a second resin, wherein the first resin is a poly$C_{3-4}$alkylene terephthalate (PPT, PBT), and the second resin is PET or PBT and is from the first resin. Such a mixture may include, for example, (i) a mixture of PBT and PET, (ii) a mixture of PPT and PET, (iii) a mixture of PPT and PBT, and others. The proportion of the first resin relative to the second resin [the first resin/the second resin] may be 20/80 to 80/20 (e.g., 30/70 to 80/20) in a weight ratio.

The proportion of the amino group-containing triazine compound (A1) relative to the total amount of the sulfuric acid and the sulfonic acid (A2) [the component (A1)/the component (A2)] is about 1/5 to 5/1 in a molar ratio. Moreover, the salt of the amino group-containing triazine compound with the sulfuric acid and/or the sulfonic acid may have a weight decrease of not larger than 15% by weight (e.g., about 0.001 to 15% by weight) when the salt is heated with increasing a temperature from 30 to 250° C. at an increasing rate of 20° C. per minute under a nitrogen flow.

In the flame-retardant auxiliary (B), the aromatic resin (B1) may comprise an aromatic ring having a hydroxyl group and/or an amino group, a polyarylate-series resin, an aromatic epoxy resin, an aromatic nylon, a polyphenylene sulfide-series resin, a polyphenylene oxide-series resin, a polycarbonate-series resin, and others. The cyclic urea-series compound or a derivative thereof (B2) may comprise a cyclic ureide [for example, a cyclic monoureide (e.g., cyanuric acid, and isocyanuric acid), and a cyclic diureide (e.g., acetyleneurea, and uric acid)], and a salt of the cyclic ureide with a melamine (e.g., melamine, melam, melem, and melon). The amino group-containing triazine compound (B3) may be melamine or a derivative thereof (e.g., melamine or a melamine condensate), guanamine or a derivative thereof [for example, guanamine, benzoguanamine, phthaloguanamine, adipoguanamine, CTU-guanamine, a guanamine compound having a heterocycle-containing group as a substituent (e.g., 2,4-diamino-6-(2'-imidazolyl-(1')-alkyl)-s-triazine) which may have an alkyl group and/or an aryl group at a ternary carbon atom of an imidazole ring thereof], and others. The inorganic metal-series compound (B4) may be a metal salt of an inorganic acid [for example, a metal salt of an oxygen acid having no sulfur atom (e.g., a metal borate, a metal hydrogen phosphate, and a metal stannate)], a metal oxide, a metal hydroxide, a metal sulfide, and others.

In the flame-retardant resin composition, for example, the base resin (R) may comprise at least a polyester-series resin, the flame retardant (A) may comprise a salt of at least one aminotriazine compound selected from the group consisting of melamine and a condensate thereof with at least one member selected from the group consisting of the sulfuric acid and the sulfonic acid (e.g., an alkanesulfonic acid such as methanesulfonic acid), and the flame-retardant auxiliary (B) may comprise the aromatic resin (B1) (e.g., an aromatic epoxy resin). Moreover, in the flame-retardant resin composition, for example, the base resin (R) may comprise at least an aromatic polyester-series resin, the flame retardant (A) may comprise a salt of at least one amino group-containing triazine compound selected from the group consisting of melamine and a condensate thereof with at least one member selected from the group consisting of the sulfuric acid and a sulfonic acid, and the flame-retardant auxiliary (B) may comprise at least one member selected from the group consisting of acetyleneurea, uric acid, a salt of melamine or a condensate thereof with cyanuric acid, and melamine or a condensate thereof. Incidentally, in the flame retardant (A) and the flame-retardant auxiliary (B), the melamine condensate may be at least one member selected from the group consisting of melam, melem, and melon.

In the flame-retardant resin composition, the proportion of the flame retardant (A) relative to the flame-retardant auxiliary (B) [the flame retardant (A)/the flame-retardant auxiliary (B)] may be about 99.99/0.01 to 1/99 in a weight ratio. Incidentally, the proportion of the flame retardant (A) relative to the aromatic resin (B1) may be about 99.99/0.01 to 20/80 in a weight ratio. The flame-retardant resin composition may contain 10 to 120 parts by weight of the flame retardant (A) and 0.001 to 5 parts by weight of the flame-retardant auxiliary (B) relative to 100 parts by weight of the base resin (R).

The flame-retardant resin composition of the present invention may further comprise at least one member selected from the group consisting of an antioxidant, a stabilizer, a dripping inhibitor, a lubricant, a plasticizer and a filler.

Moreover, the present invention includes a process for producing a flame-retardant resin composition, which comprises mixing (R) a base resin, (A) a flame retardant, and (B) a flame-retardant auxiliary, and also includes a shaped article formed from the above-mentioned flame-retardant resin composition.

The shaped article may have, as an electrical property, a comparative tracking index of not less than 300 V (e.g., not less than 350 V), and have, as a flame retardancy, a flame-retardant performance of V-2, V-1 or V-0 in a flame retardancy test measured by using a test piece having a thickness of 0.8 mm in accordance with UL94. The shaped article may be an electric and/or electronic device part, an office automation device part, an automotive part, or a mechanical part or machine element. Moreover, the shaped article may be a connector part, a switch part, a relay part, a transformer part, a breaker part, an electromagnetic switch device part, a focus case part, a capacitor part, a motor part, a copying machine part, or a printer part.

The present invention further includes a process for producing a shaped article, which comprises injection-molding a flame-retardant resin composition containing (R) a base resin, the flame retardant (A) and (B) the flame-retardant auxiliary.

EFFECTS OF THE INVENTION

According to the present invention, combination use of (A) a salt of an amino group-containing triazine compound with a sulfuric acid and/or a sulfonic acid and (B) a specific flame-retardant auxiliary imparts flame retardancy to a base resin at a high level without using a halogen-containing flame retardant and/or an organic phosphorus-containing flame retardant even when the proportion of the flame retardant is low. Moreover, according to the present invention, flame retardancy can be imparted to the base resin without deteriorating characteristics of the base resin, and a resin composition of much practical use can be obtained. Further, the present invention ensures both improvement in flame retardancy and inhibition of bleeding out of a shaped article. Furthermore, according to the present invention, electrical properties (e.g., tracking resistance) of the shaped article can be also improved.

DETAILED DESCRIPTION OF THE INVENTION

[Base Resin]

The base resin (R) includes various thermoplastic resins utilizable for molding process, and for example, a polyester-series resin, a styrenic resin, a polyamide-series resin, a polycarbonate-series resin, a polyphenylene oxide-series resin, a vinyl-series resin, an olefinic resin, an acrylic resin, and others. These base resins may be used singly or in combination.

(1) Polyester-Series Resin

The polyester-series resin is a homopolyester or copolyester obtained by, for example, a polycondensation of a dicarboxylic acid component and a diol component, a polycondensation of a hydroxycarboxylic acid or a lactone, or a polycondensation of these components. The preferred polyester-series resin usually includes a saturated polyester-series resin, in particular an aromatic saturated polyester-series resin.

The dicarboxylic acid component may include, for example, an aliphatic dicarboxylic acid (e.g., a dicarboxylic acid having about 4 to 40 carbon atoms such as succinic acid, adipic acid, suberic acid, sebacic acid, dodecanedicarboxylic acid or dimeric acid, preferably a dicarboxylic acid having about 4 to 14 carbon atoms), an alicyclic dicarboxylic acid (e.g., a dicarboxylic acid having about 8 to 12 carbon atoms such as hexahydrophthalic acid), an aromatic dicarboxylic acid [for example, a dicarboxylic acid having about 8 to 16 carbon atoms, e.g., an arenedicarboxylic acid (e.g., phthalic acid, isophthalic acid, terephthalic acid, and a naphthalene-dicarboxylic acid such as 2,6-naphthalenedicarboxylic acid), a bisphenyl-dicarboxylic acid (e.g., 4,4'-biphenyldicarboxylic acid, diphenylether-4,4'-dicarboxylic acid, a diphenylalkanedicarboxylic acid (e.g., 4,4'-diphenylethanedicarboxylic acid), and diphenylketonedicarboxylic acid], or a derivative thereof (e.g., a derivative, capable of producing an ester, such as a lower alkyl ester, an aryl ester, and an acid anhydride). These dicarboxylic acid components may be used singly or in combination. Further, if necessary, the dicarboxylic acid component may be used in combination with a polycarboxylic acid such as trimellitic acid or pyromellitic acid.

The preferred dicarboxylic acid component includes an aromatic dicarboxylic acid such as terephthalic acid, isophthalic acid, or naphthalenedicarboxylic acid.

As the diol component, for example, there are mentioned an aliphatic alkylene glycol (e.g., an aliphatic glycol having about 2 to 12 carbon atoms such as ethylene glycol, trimethylene glycol, propylene glycol, 1,4-butanediol, neopentyl glycol or hexanediol, preferably an aliphatic glycol having about 2 to 10 carbon atoms), a polyoxyalkylene glycol [e.g., a glycol having a plurality of oxyalkylene units of which the alkylene group has about 2 to 4 carbon atoms, for example, diethylene glycol, dipropylene glycol, ditetramethylene glycol, triethylene glycol, tripropylene glycol, and a polytetramethylene glycol], an alicyclic diol (e.g., 1,4-cyclohexanediol, 1,4-cyclohexanedimethanol, and hydrogenated bisphenol A), and others. Moreover, the diol component may be used in combination with an aromatic diol such as hydroquinone, resorcinol, biphenol, 2,2-bis(4-hydroxyphenyl)propane, 2,2-bis-(4-(2-hydroxyethoxy)phenyl)propane, or xylylene glycol. These diol components may be used singly or in combination. Further, if necessary, the diol component may be used in combination with a polyol such as glycerin, trimethylolpropane, or pentaerythritol.

The preferred diol component includes a $C_{2-6}$alkylene glycol (e.g., a linear alkylene glycol such as ethylene glycol, trimethylene glycol, propylene glycol or 1,4-butanediol), a (poly)oxyalkylene glycol having a repeating oxyalkylene unit of about 2 to 4 [a glycol containing a (poly)(oxy-$C_{2-4}$alkylene) unit, such as diethylene glycol], and 1,4-cyclohexanedimethanol.

The hydroxycarboxylic acid may include, for example, a hydroxycarboxylic acid such as hydroxybenzoic acid, hydroxynaphthoic acid, glycolic acid or lactic acid, or a derivative thereof.

Examples of the lactone may include a $C_{3-12}$lactone such as propiolactone or caprolactone (e.g., ε-caprolactone), and others.

The preferred polyester-series resin includes a homopolyester or copolyester containing an alkylene arylate unit such as an alkylene terephthalate or an alkylene naphthalate as a main unit (e.g., about 50 to 100% by weight, preferably about 75 to 100% by weight) [for example, a homopolyester such as a polyalkylene terephthalate (e.g., a poly$C_{2-4}$alkylene terephthalate such as a poly(1,4-cyclohexanedimethylene terephthalate) (PCT), a polyethylene terephthalate (PET), a polypropylene terephthalate (PPT) [PPT (a homopolyester obtained by polycondensation of a terephthalic acid component and a propylene glycol component), a polytrimethylene terephthalate (PTT) (a homopolyester obtained by polycondensation of a terephthalic acid component and a trimethylene glycol component)], or a polybutylene terephthalate (PBT)), a polyalkylene naphthalate (e.g., a poly$C_{2-4}$alkylene naphthalate such as a polyethylene naphthalate, a polypropylene naphthalate or a polybutylene naphthalate); and a copolyester containing alkylene terephthalate and/or alkylene naphthalate unit(s) as a main unit (e.g.,not less than 50% by weight)]. The particularly preferred polyester-series resin includes a polybutylene terephthalate-series resin containing a butylene terephthalate unit as a main unit [e.g., a polybutylene terephthalate, and a polybutylene terephthalate copolyester (for example, a comonomer-modified PBT, e.g., a PBT modified (or copolymerized) with an asymmetric dicarboxylic acid, such as isophthalic acid-modified PBT (or isophthalic acid-copolymerized PBT))], a polyethylene terephthalate-series resin containing an ethylene terephthalate unit as a main unit (e.g., a polyethylene terephthalate, and a polyethylene terephthalate copolyester), and a polypropylene-series resin (e.g., a polypropylene terephthalate, and a polypropylene terephthalate copolyester). Incidentally, these polyester-series resins may be used singly or in combination.

Moreover, in the copolyester, a copolymerizable monomer (a comonomer) may include a $C_{2-6}$alkylene glycol (e.g., a linear or branched alkylene glycol such as ethylene glycol, propylene glycol or 1,4-butanediol), a (poly)oxyalkylene glycol which has a repeating oxyalkylene unit of about 2 to 4 (e.g., a glycol containing a (poly) (oxy-$C_{2-4}$alkylene) unit, such as diethylene glycol), a $C_{6-12}$aliphatic dicarboxylic acid (e.g., adipic acid, pimelic acid, suberic acid, azelaic acid, and sebacic acid), an aromatic dicarboxylic acid (e.g., phthalic acid, isophthalic acid, and diphenyldicarboxylic acid (in particular, an asymmetric aromatic dicarboxylic acid such as phthalic acid or isophthalic acid)), a hydroxycarboxylic acid (e.g., hydroxybenzoic acid, and hydroxynaphthoic acid), a salt of sulfo-aromatic dicarboxylic acid [for example, an alkali metal salt of sulfoisophthalic acid (e.g., 5-sodium sulfoisophthalate), and a phosphonium salt of sulfoisophthalic acid]. Incidentally, the polyester-series resin may have not only a linear chain structure but also a branched chain structure, or crosslinked structure as far as melt-moldability thereof is not deteriorated. Moreover, the polyester-series resin may be a liquid crystalline polyester.

The polyester-series resin may be a mixture of a plurality of resins different in the species (e.g., a $C_{2-4}$alkylene glycol). Such a mixture may include a mixture of a first resin selected from $C_{3-4}$alkylene terephthalates (PPT, and PBT) and a second resin (e.g., a polyethylene terephthalate or a polybutylene terephthalate) different from the first resin, for example, (i) a mixture of a polybutylene terephthalate and a polyethylene terephthalate, (ii) a mixture of a polypropylene terephthalate and a polyethylene terephthalate, and (iii) a mixture of a polypropylene terephthalate and a polybutylene terephthalate. Among these mixtures, a mixture of a polybutylene terephthalate and a polyethylene terephthalate, or a mixture of a polypropylene terephthalate and a polyethylene terephthalate is particularly preferred.

In the resin mixture, the proportion of each resin is not particularly limited to specific one, and for example, the proportion (weight ratio) of the first resin relative to the second resin [the first resin/the second resin] may be about 20/80 to 80/20, preferably about 30/70 to 80/20 (e.g., about 30/70 to 75/25), and more preferably about 35/65 to 70/30.

The polyester-series resin may be produced by a conventional manner, for example, transesterification, direct esterification.

(2) Styrenic Resin

As the styrenic resin, for example, there may be mentioned a homo- or copolymer of a styrenic monomer (e.g., styrene, vinyltoluene, and α-methylstyrene); a copolymer of the styrenic monomer and a vinyl monomer [e.g., an unsaturated nitrile (such as acrylonitrile), an α,β-monoolefinic unsaturated carboxylic acid or an acid anhydride thereof or an ester thereof (such as a (meth)acrylic acid ester, (meth)acrylic acid or maleic anhydride)]; a styrenic graft copolymer; and a styrenic block copolymer.

The styrenic resin may include a polystyrene [GPPS, and SPS (a syndiotactic polystyrene)], a styrene-methyl methacrylate copolymer, a styrene-(meth)acrylic acid copolymer, a styrene-acrylonitrile copolymer (AS resin), a graft copolymer in which a styrenic monomer and, if necessary, a copolymerizable monomer (at least one member selected from the group consisting of acrylonitrile and methyl methacrylate) is graft-polymerized to a rubber component (e.g., a polybutadiene, an acrylic rubber, and a styrene-butadiene copolymer rubber) [for example, a high impact polystyrene (HIPS), an ABS resin, and an MBS resin], a block copolymer comprising a polystyrene block and a diene or olefin block [for example, a styrene-butadiene-styrene (SBS) block copolymer, a styrene-isoprene block copolymer, a styrene-isoprene-styrene (SIS) block copolymer, a hydrogenated styrene-butadiene-styrene (SEBS) block copolymer, and a hydrogenated styrene-isoprene-styrene (SEPS) block copolymer, an epoxidized SBS, and an epoxidized SIS]. These styrenic resins may be used singly or in combination.

(3) Polyamide-Series Resin

The polyamide may include a polyamide derived from a diamine and a dicarboxylic acid; a polyamide obtained from an aminocarboxylic acid, and if necessary in combination with a diamine and/or a dicarboxylic acid; a polyamide derived from a lactam, and if necessary in combination with a diamine and/or a dicarboxylic acid. The polyamide may also include a copolyamide. Each of the diamine, the dicarboxylic acid, the aminocarboxylic acid, and the lactam may be used singly or in combination.

As the diamine, there may be mentioned, for example, a $C_{3-10}$aliphatic diamine such as tetramethylenediamine or hexamethylenediamine, and an alicyclic diamine such as bis (4-aminocyclohexyl)methane or bis(4-amino-3-methylcyclohexyl)methane. If necessary, the diamine may be used in combination with an aromatic diamine such as phenylenediamine or metaxylylenediamine.

Examples of the dicarboxylic acid may include a $C_{4-20}$aliphatic dicarboxylic acid such as adipic acid, suberic acid, sebacic acid or dodecanoic diacid; a dimerized fatty acid (dimeric acid); an alicyclic dicarboxylic acid such as cyclohexane-1,4-dicarboxylic acid or cyclohexane-1,3-dicarboxylic acid; an aromatic dicarboxylic acid such as phthalic acid, phthalic anhydride, isophthalic acid, terephthalic acid or naphthalenedicarboxylic acid; and others.

As the aminocarboxylic acid, there may be mentioned, for example, a $C_{4-20}$aminocarboxylic acid such as aminoheptanoic acid, aminononanoic acid or aminoundecanoic acid. As the lactam, for example, there may be mentioned a $C_{4-20}$lactam such as caprolactam or dodecalactam.

The polyamide-series resin may include an aliphatic polyamide (such as a nylon 46, a nylon 6, a nylon 66, a nylon 610, a nylon 612, a nylon 11 or a nylon 12), a polyamide obtainable from an aromatic dicarboxylic acid (e.g., terephthalic acid and/or isophthalic acid) and an aliphatic diamine (e.g., hexamethylenediamine, and nonamethylenediamine), a polyamide obtainable from both aromatic and aliphatic dicarboxylic acids (e.g., both terephthalic acid and adipic acid) and an aliphatic diamine (e.g., hexamethylenediamine), and others. These polyamide-series resins may be used singly or in combination.

(4) Polycarbonate-Series Resin

The polycarbonate-series resin may include a polymer obtainable through the reaction of a dihydroxy compound (e.g., an alicyclic diol, and a bisphenol compound) with phosgene or a carbonic ester such as diphenyl carbonate. Examples of the bisphenol compound may include a bis(hydroxyaryl)$C_{1-10}$alkane such as bis(4-hydroxyphenyl)methane or 2,2-bis(4-hydroxyphenyl)propane (bisphenol A); a bis (hydroxyaryl)$C_{4-10}$cycloalkane such as 1,1-bis(4-hydroxyphenyl)cyclohexane; 4,4'-dihydroxydiphenyl ether; 4,4'-dihydroxydiphenyl sulfone; 4,4'-dihydroxydiphenyl sulfide; 4,4'-dihydroxydiphenyl ketone; and others.

The preferred poly carbonate-series resin includes a bisphenol A-based polycarbonate. These polycarbonate-series resins may be used singly or in combination.

(5) Polyphenylene Oxide-Series Resin

The polyphenylene oxide-series resin (polyphenylene ether-series resin) may include a homopolymer and a copolymer. As the homopolymer, there may be mentioned a poly (mono-, di- or tri$C_{1-6}$alkyl-phenylene) oxide, a poly(mono- or di$C_{6-20}$aryl-phenylene) oxide, and a poly(mono$C_{1-6}$alkyl-mono$C_{6-20}$aryl-phenylene) oxide. For example, such a homopolymer may include a poly(2,6-dimethyl-1,4-phenylene)oxide, a poly(2,5-dimethyl-1,4-phenylene)oxide, and a poly(2,5-diethyl-1,4-phenylene)oxide.

As the copolymer of a polyphenylene oxide, there may be mentioned: a copolymer having not less than two of monomer units constituting the above-mentioned homopolymers (e.g., a random copolymer having 2,6-dimethyl-1,4-phenylene oxide unit and 2,3,6-trimethyl-1,4-phenylene oxide unit); a modified polyphenylene oxide copolymer comprising a polyphenylene oxide block as the main structure and an alkyl phenol-modified benzene formaldehyde resin block which is obtainable by a reaction of an alkyl phenol (such as cresol) with a benzene formaldehyde resin (a formaldehyde condensate such as a phenol resin) or an alkylbenzene formaldehyde resin; a modified graft copolymer in which a styrenic polymer and/or an unsaturated carboxylic acid or an anhydride thereof (e.g., (meth)acrylic acid, and maleic anhydride) is grafted to a polyphenylene oxide or a copolymer thereof; and others. These polyphenylene oxide-series resins may be used singly or in combination.

(6) Vinyl-Series Resin

The vinyl-series resin may include a homo- or copolymer of a vinyl-series monomer [e.g., a vinyl ester such as vinyl acetate; a chlorine-containing vinyl monomer (e.g., vinyl chloride, and chloroprene); a fluorine-containing vinyl monomer; a vinyl ketone; a vinyl ether; and a vinyl amine such as N-vinylcarbazole], or a copolymer of a vinyl-series monomer and other copolymerizable monomer. A derivative of the above-mentioned vinyl-series resin (e.g., a polyvinyl alcohol, a polyvinyl acetal such as a polyvinyl formal or a polyvinyl butyral, and an ethylene-vinyl acetate copolymer) maybe also used. These vinyl-series resins may be used singly or in combination.

(7) Olefinic Resin

The olefinic resin may include, for example, a homo- or copolymer of an α-$C_{2-10}$olefin (such as ethylene or propylene), a cyclic olefin-series resin (e.g., a homopolymer of a $C_{3-10}$cyclic olefin, and an $\alpha$-$C_{2-10}$olefin-cyclic olefin copolymer), in particular, a propylene-series resin and an ethylene-series resin (e.g., a propylene-ethylene copolymer, a propylene-(meth)acrylic acid copolymer, an ethylene-ethyl(meth)acrylate copolymer, and an ethylene-glycidyl(meth)acrylate copolymer).

(8) Acrylic Resin

The acrylic resin may include, for example, a homo-or copolymer of a (meth)acrylic monomer (e.g., (meth)acrylic acid or an ester thereof), in addition a copolymer of a (meth)acrylic monomer and a copolymerizable monomer (e.g., a (meth)acrylic acid-styrene copolymer, and a methyl(meth)acrylate-styrene copolymer).

(9) Other Resins

As other resins, there may be exemplified a polyacetal resin; a ketone resin; a polysulfone-series resin [e.g., a polysulfone, a poly(ether sulfone), and a poly(4,4'-bisphenol ether sulfone)]; a poly(ether ketone)-series resin (e.g., a poly(ether ketone), and a poly(ether ether ketone); a poly(ether imide); a thermoplastic polyurethane-series resin; a thermoplastic polyimide; a polyoxybenzylene; a thermoplastic elastomer; and the like.

The preferred base resin includes a polyester-series resin which may be a liquid crystalline polyester, a styrenic resin, a polyamide-series resin, a polycarbonate-series resin, a polyphenylene oxide-series resin, and a vinyl-series resin, and more preferably includes a polyester-series resin, a polycarbonate-series resin, and a styrenic resin. In particular, the base resin at least containing a polyester-series resin (e.g., a PBT-series resin, and a PET-series resin) is preferred.

From the viewpoint of inhibition of blooming, the polyester-series resin and the styrenic resin may be used in combination. The proportion (weight ratio) of the polyester-series resin relative to the styrenic resin [the former/the latter] is about 99/1 to 50/50, preferably about 95/5 to 60/40, and more preferably about 90/10 to 70/30.

The number average molecular weight of the base resin is not particularly limited to a specific one, and is suitably selected depending on a kind or application of resin. For example, the number average molecular weight may be selected within the range of about $5 \times 10$ to $200 \times 10^4$, preferably about $1 \times 10^4$ to $150 \times 10^4$, and more preferably about $1 \times 10^4$ to $100 \times 10^4$. Moreover, in the case where the base resin is a polyester-series resin, the number average molecular weight may for example be about $5 \times 10^3$ to $100 \times 10^4$, preferably about $1 \times 10^4$ to $70 \times 10^4$, and more preferably about $1.2 \times 10^4$ to $30 \times 10^4$.

[Flame Retardant (A)]

The flame retardant to be used in the present invention comprises a salt of (A1) an amino group-containing triazine compound with (A2) at least one member selected from the group consisting of a sulfuric acid and a sulfonic acid. The salt may be used singly or in combination.

The amino group-containing triazine compound may include a triazine compound having a basic nitrogen atom [e.g., a triazine compound having an amino group (including a mono-substituted amino group (imino group))], for example, melamine or a derivative thereof, such as a 1,3,5-triazine compound [e.g., melamine, a substituted melamine (e.g., an alkylmelamine such as 2-methylmelamine, and guanylmelamine), a melamine condensate (e.g., melam, melem, and melon), or a co-condensation resin of melamine (e.g., a melamine-formaldehyde resin, a phenol-melamine resin, a benzoguanamine-melamine resin, and an aromatic polyamine-melamine resin); a cyanuric amide such as ammeline or ammelide; and guanamine or a derivative thereof, e.g., guanamine, acetoguanamine, benzoguanamine, adipoguanamine, phthaloguanamine, CTU-guanamine, a guanamine compound having a heterocycle-containing group as a substituent [for example, compounds described in Japanese Patent Publication No. 41120/1972 (JP-47-41120B), e.g., a 2,4-diamino-6-(2'-imidazolyl-(1')-$C_{1-4}$alkyl)-s-triazine which may have a $C_{1-6}$alkyl group and/or a $C_{6-10}$aryl group at a ternary carbon atom of an imidazole ring thereof, such as 2,4-diamino-6-(2'-imidazolyl)ethyl-s-triazine]], and a variety of aminotriazines such as a 1,2,3-triazine compound (e.g., 1,2,3-triazine, and benzo-1,2,3-triazine) and a 1,2,4-triazine compound. Incidentally, the arbitrary site(s) constituting a triazine ring (nitrogen atom and carbon atom, particularly carbon atom) may have an amino group(s) as substituent(s). The number of amino groups is not particularly limited to a specific one, and for example, is about 1 to 3, and particularly about 2 to 3.

The preferred amino group-containing triazine compound includes melamine, a melamine condensate [for example, melam, melem, and melon (in particular, melam and melem)], and others.

The amino group-containing triazine compound, and the sulfuric acid and/or the sulfonic acid usually form a salt through at least one amino group as a substituent of the triazine ring. In the case where the triazine compound has a plurality of amino groups, all of the amino groups may form a salt with the acid. For example, a part of the amino groups may form a salt with the sulfuric acid and all or a part of the remaining amino group(s) may form a salt with the sulfonic acid.

Examples of the sulfuric acid may include a non-condensed sulfuric acid such as sulfuric acid (orthosulfuric acid) or sulfurous acid; and a condensed sulfuric acid such as pyrosulfuric acid. The preferred sulfuric acid includes orthosulfuric acid and pyrosulfuric acid (hereinafter, orthosulfuric acid or pyrosulfuric acid is sometimes referred to as simply (pyro)sulfuric acid). The sulfuric acid may be used singly or in combination.

The sulfonic acid may include an alkanesulfonic acid (e.g., methanesulfonic acid, ethanesulfonic acid, propanesulfonic acid, butanesulfonic acid, and ethanedisulfonic acid), an arenesulfonic acid (e.g., benzenesulfonic acid, toluenesulfonic acid, naphthalenesulfonic acid, and benzenedisulfonic acid), and others. The preferred sulfonic acid includes a $C_{1-10}$alkanesulfonic acid and a $C_{6-12}$arenesulfonic acid. The sulfonic acid may be used singly or in combination.

(Salt of Amino Group-Containing Triazine Compound with Sulfuric Acid)

The salt of the amino group-containing triazine compound with the sulfuric acid (or the sulfate of the amino group-containing triazine compound) may include, for example, a salt of anon-condensed sulfuric acid [for example, a melamine sulfate (e.g., melamine sulfate, dimelamine sulfate, and guanylmelamine sulfate), a melamine salt of a non-condensed sulfuric acid such as melamine sulfite corresponding to the melamine sulfate of the non-condensed sulfuric acid; and a melam salt, a melem salt, a melon salt, a melamine-melam-melem triple (or complexed) salt and a guanamine salt, each corresponding to the melamine salt of the non-condensed sulfuric acid], a salt of a condensed sulfuric acid [for example, a melamine pyrosulfate (e.g., melamine pyrosulfate, and dimelamine pyrosulfate), and a melam salt (e.g., melam pyrosulfate, and dimelam pyrosulfate), a melem salt, a melon salt, a melamine-melam-melem triple salt and a guanamine salt, each corresponding to the melamine pyrosulfate]. The preferred sulfate includes a melamine (pyro)sulfate such as melamine sulfate, dimelamine sulfate, or melamine pyrosulfate; a melam (pyro)sulfate such as melam sulfate, or dimelam pyrosulfate; and a melamine-melam-melem triple salt of (pyro)sulfuric acid.

Incidentally, melamine sulfate and dimelamine sulfate (hereinafter, melamine sulfate or dimelamine sulfate is sometimes referred to as simply (di)melamine sulfate) can be obtained, for example, by methods described in Japanese Patent Application Laid-Open Nos. 231517/1996 (JP-8-231517A) and 255811/1997 (JP-9-255811A), and others. For example, (di) melamine sulfate is available from Sanwa Chemical Co., Ltd. as trade name "Apinon 901". Moreover, dimelam pyrosulfate can be obtained, for example, by a method described in Japanese Patent Application Laid-Open No. 306082/1998 (JP-10-306082A), and others.

(Salt of Amino Group-Containing Triazine Compound with Sulfonic Acid)

The salt of the amino group-containing triazine compound with the sulfonic acid (or the sulfonate of the amino group-containing triazine compound) may include a salt of an alkylsulfonic acid (a salt of an alkanesulfonic acid) [for example, a melamine alkylsulfonate (alkanesulfonate) (a melamine $C_{1-6}$alkanesulfonate such as melamine methanesulfonate or melamine ethanesulfonate, or a melamine $C_{1-6}$alkanedisulfonate corresponding thereto), and a melam salt, a melem salt, a melon salt, a melamine-melam-melem triple salt, a guanamine salt, an acetoguanamine salt and a benzoguanamine salt, each corresponding to the melamine alkanesulfonate], a salt of the amino group-containing triazine compound with an arylsulfonic acid (an arenesulfonic acid) [for example, a melamine arylsulfonate (arenesulfonate) (e.g., melamine benzenesulfonate, and melamine toluenesulfonate), and a melam salt, a melem salt, a melon salt, a melamine-melam-melem triple salt, a guanamine salt, an acetoguanamine salt and a benzoguanamine salt, each corresponding to the melamine arenesulfonate]. Among these sulfonates, the preferred one includes a $C_{1-4}$alkanesulfonate such as a methanesulfonate (e.g., a melamine salt, a melam salt, a melem salt, and a melamine•melam•melem triple salt), a benzenesulfonate or a p-toluenesulfonate (e.g., a melamine salt, a melam salt, a melem salt, and a melamine melam-melem triple salt), and others. The salt of the amino group-containing triazine compound with the sulfonic acid can be obtained, for example, by methods described in Japanese Patent Application Laid-Open Nos. 511409/1998 (JP-10-511409A) and 288361/2001 (JP-2001-288361A), and others. Moreover, melam methanesulfonate is available from Nissan Chemical Industries, Ltd. as "MMS-200".

The proportion of the amino group-containing triazine compound (A1) relative to the total amount of the sulfuric acid and the sulfonic acid (A2) is not particularly limited to a specific one, and for example, the former/the latter (molar ratio) is about 1/5 to 5/1, preferably about 1/2 to 4/1, and more preferably about 1/1 to 3/1. The equivalence ratio of an amino group contained in the amino group-containing triazine compound relative to a salifiable site of the acid (the sulfuric acid and the sulfonic acid) is not also particularly limited to a specific one, and is, for example, about 10/1 to 1/2, preferably about 5/1 to 1/1, and particularly about 4/1 to 1/1.

Moreover, in some cases, the salt of the amino group-containing triazine compound with the sulfuric acid and/or the sulfonic acid contains component(s) such as a free amino group-containing triazine compound, water (adsorbed water, and crystallization water) and a solvent, and such components adversely affect processability, in addition, moldability (or formability) of the resin composition. In such a case, the use of the salt, as the sulfate or the sulfonate, in which an amount of a volatile matter(s) (i.e., weight loss of the salt) by heating is small, can also inhibit the deterioration of processability and moldability due to the components.

The weight loss of the sulfate or the sulfonate due to heating may be, for example, not more than 15% by weight (e.g., about 0.001 to 15% by weight), preferably not more than 10% by weight (e.g., about 0.001 to 10% by weight), more preferably not more than 5% by weight (e.g., about 0.001 to 5% by weight), and particularly not more than 3% by weight (e.g., about 0.001 to 3% by weight). Incidentally, the weight loss by heating can be, for example, represented by a ratio (% by weight) of weight decrease or loss based on the weight of the salt at 250° C. and that of the salt at 30° C. when the salt is heated with increasing a temperature from 30° C. to 250° C at a heating rate of 20° C./min. under a nitrogen flow by using a thermogravimetric analysis apparatus.

Incidentally, in the sulfate and the sulfonate, the volatilization amount can be reduced by preheating under an atmospheric air or an inactive gas (e.g., helium, nitrogen, and argon) atmosphere or under such a gas flow. The heat treatment may be, for example, carried out by heating at a temperature of 100 to 350° C. for 0.5 to 24 hours.

The flame retardant (A) may be treated with the use of a surface-modifying agent such as an epoxy-series compound, a coupling agent (e.g., a silane-series compound, a titanate-series compound, and an aluminum-series compound) or a chromium-series compound.

Moreover, the flame retardant (A) may be coated (or coating-treated) with a coating component, for example, a metal, a glass, a cyanurate of a triazine derivative, a thermosetting resin (e.g., a phenol resin, a urea resin, a melamine resin, an aniline resin, a furan resin, a xylene resin, or a co-condensed resin thereof, an unsaturated polyester resin, an alkyd resin, a vinylester resin, a diallylphthalate resin, an epoxy resin, a polyurethane resin, a silicon-containing resin, and a polyimide), a thermoplastic resin, or the like. Among these coating components, usually the flame retardant is preferably coated with a thermosetting resin (e.g., a phenol resin, or an epoxy resin). For example, a coating method for the flame retardant (A) may be referred to Japanese Patent Application Laid-Open No. 169120/2000 (JP-2000-169120A), Japanese Patent Application Laid-Open No. 131293/2001 (JP-2001-131293A), and others. In the flame retardant coated with the coating component (the coated flame retardant) (A), the proportion of the coating component is not particularly limited to a specific one, and is about 0.1 to 20% by weight, preferably about 0.1 to 10% by weight (e.g., about 0.1 to 8% by weight) relative to the coated flame retardant.

[Flame-Retardant Auxiliary (B)]

The flame-retardant auxiliary (B) may include (B1) an aromatic resin, (B2) a cyclic urea-series compound or a derivative thereof, (B3) an amino group-containing triazine compound, and (B4) an inorganic metal-series compound. These flame-retardant auxiliaries may be used singly or in combination.

[Aromatic Resin (B1)]

The resinous flame-retardant auxiliary (or flame retardant) may include a resin containing an aromatic ring having a hydroxyl group and/or an amino group, a polyarylate-series resin, an aromatic epoxy resin, a polycarbonate-series resin, an aromatic nylon, a polyphenylene oxide-series resin, and a polyphenylene sulfide-series resin. As the polyphenylene oxide-series resin and the polycarbonate-series resin, a resin similar to the resin exemplified in the paragraph of the base resin may be used. The aromatic resin to be employed is usually different from the base resin.

(1) Resin Containing Aromatic Ring Having Hydroxyl group and/or Amino Group

The aromatic ring may be located in a main chain or a side chain. For example, examples of a resin having the aromatic ring in a main chain thereof may include a novolak resin, and an aralkyl resin. The resin having the aromatic ring in a side chain thereof may include an aromatic vinyl resin.

(1-1) Novolak Resin

The novolak resin has a repeating unit represented by the following formula (1):

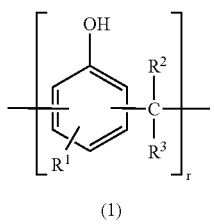

(1)

[Formula 1]

wherein $R^1$ to $R^3$ are the same or different, each representing a hydrogen atom, an alkyl group, or an aryl group, "r" denotes an integer of not less than 1.

The alkyl group and the aryl group may include a $C_{1-20}$alkyl group such as methyl, ethyl, butyl or hexyl group (particularly, a $C_{1-12}$alkyl group), a $C_{6-20}$aryl group such as phenyl group, and a substituted aryl group (particularly a $C_{1-4}$alkyl-substituted aryl group).

The novolak resin (particularly a random novolak resin) is usually obtainable by a reaction of a phenol compound with an aldehyde. As the phenol compound, for example, there may be mentioned phenol, cresol, xylenol, an alkyl phenol (e.g., a $C_{1-20}$alkyl phenol such as t-butyl phenol or p-octyl phenol), a $C_{6-10}$aryl phenol (e.g., phenyl phenol), a $C_{6-10}$aryl-$C_{1-4}$alkyl-phenol (e.g., benzyl phenol), and others. These phenol compounds may be used singly or in combination.

The aldehyde may include, for example, an aliphatic aldehyde such as formaldehyde, and an aromatic aldehyde such as phenylacetaldehyde. Moreover, a condensate of formaldehyde such as trioxane or paraformaldehyde may be also used. The ratio of the phenol compound relative to the aldehyde (the former/the latter) is about 1/0.5 to 1/1 (molar ratio).

The condensation reaction of the phenol compound with the aldehyde is usually carried out in the presence of an acid catalyst [for example, an inorganic acid (e.g., hydrochloric acid, a sulfuric acid, and a phosphoric acid), and an organic acid (e.g., p-toluenesulfonic acid, and oxalic acid)]. In particular, it is preferred to use a phenol novolak resin having decreased content of a monomer or dimer of a phenol compound. Such a phenol novolak resin is, for example, available as trade name "SUMILITE RESIN PR-53647", "SUMILITE RESIN PR-NMD-100 series", or "SUMILITE RESIN PR-NMD-200 series" from Sumitomo Durez Co., Ltd.

Moreover, as the novolak resin, a high-orthonovolak resin having an ortho/para ratio of not less than 1 may be used. In particular, as the novolak resin, it is preferred to use a novolak resin having an ortho/para ratio of not less than 1, for example, about 1 to 20 (particularly about 1 to 15), so-called a high-orthonovolak resin. Such a high-orthonovolak resin is procurable from Sumitomo Durez Co., Ltd. as "SUMILITE RESIN HPN SERIES".

The process for producing these novolak resins may be referred to Japanese Patent Application Laid-Open No. 172348/2001 (JP-2001-172348A), Japanese Patent Application Laid-Open No. 273133/2000 (JP-2000-273133A), and others.

Incidentally, there may be also used a co-condensate of the above-mentioned phenol compound with a co-condensable component such as a dioxybenzene compound, a naphthol compound, a bisphenol compound (e.g., a bisphenol compound such as bisphenol A or bisphenol D), an alkylbenzene (e.g., toluene, and xylene), an aniline compound, a furfural compound, a urea compound or a triazine compound (e.g., urea, cyanuric acid, melamine, and guanamine), a terpene compound, a cashew nut, and a rosin.

Moreover, a modified novolak resin-may be also employed, and the resin may include a novolak resin in which phenolic hydroxyl groups are partially or wholly modified with at least one compound selected from phosphorus-containing compounds (e.g., a phosphoric acid compound such as phosphoric acid, and an acid anhydride, halide, salt or ester (in particular, an aliphatic ester) thereof) and boron-containing compounds (e.g., a boric acid compound, and an acid anhydride, halide, salt or ester thereof), for example, a phosphoric acid-modified novolak resin, and a boric acid-modified novolak resin.

Further, a modified novolak resin being a novolak resin (random novolak resin and high-ortho novolak resin) in which the hydrogen atom of the phenolic hydroxyl group is partially or wholly modified (or substituted) with a metal ion, a silyl group, an organic group (e.g., an alkyl group, an alkylcarbonyl group, an arylcarbonyl group (such as benzoyl group) and a (poly)alkylene oxide group) is also available.

Preferred as the novolak resins are, for example, phenol-formaldehyde novolak resin, an alkylphenol-formaldehyde novolak resin (e.g., a cresol-formaldehyde novolak resin, a t-butylphenol-formaldehyde novolak resin, a p-octylphenol-formaldehyde resin, and a xylenol-formaldehyde novolak resin), a co-condensate thereof (an aminotriazine-novolak resin in which a novolak resin is modified with a triazine compound such as melamine) and a modified resin thereof [an alkylene oxide adduct polymer in which a $C_{1-4}$alkylene oxide (such as ethylene oxide or propylene oxide) is added to a novolak resin], and a mixture thereof. The aminotriazine-novolak resin is, for example, from Dainippon Ink And Chemicals, Inc. as trade name "PHENOLITE".

There is no particular restriction as to the number average molecular weight of the novolak resin, and it may be selected within the range of 300 to $5\times10^4$, and preferably 300 to $1\times10^4$.

(1-2) Aralkyl Resin

The aralkyl resin has a structural unit represented by the following formula (2):

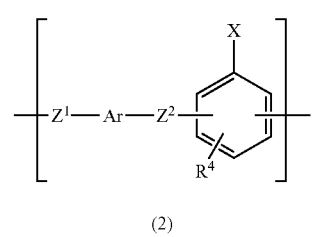

(2)

[Formula 2]

wherein Ar represents an aromatic group, $Z^1$ and $Z^2$ are the same or different, each representing an alkylene group, $R^4$ represents a hydrogen atom or an alkyl group, and X represents a hydroxyl group, an amino group, or an N-substituted amino group.

The aromatic group represented by Ar may include a $C_{6-20}$arylene group (e.g., a phenylene group, and a naphthylene group). Among them, the phenylene group (particularly p-phenylene group) is preferred. The alkylene group represented by $Z^1$ and $Z^2$ may include a $C_{1-4}$alkylene group such as methylene group or ethylene group. The alkyl group represented by $R^4$ may include a $C_{1-4}$alkyl group such as methyl group or ethyl group. The N-substituted amino group represented by X may include a mono- or di$C_{1-4}$alkylamino group (e.g., dimethylamino group, and diethylamino group).

As the aralkyl resin, a phenol aralkyl resin in which X is a hydroxyl group is used practically. The preferred phenol aralkyl resin may include a resin having methylene groups as $Z^1$ and $Z^2$, a phenylene group as Ar, a hydrogen atom as $R^4$ in the above formula (2), and having a p-xylene-substituted phenol represented by the following formula (3) as a repeating unit.

[Formula 3]

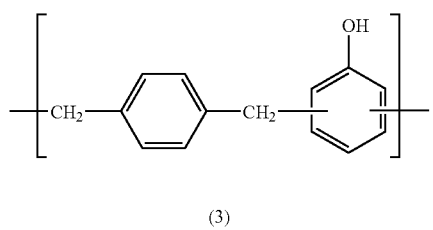

(3)

The aralkyl resin may be usually obtained by reacting a compound represented by the following formula (4) with a phenol compound or an aniline compound.

$$Y-Z^1-Ar-Z^2-Y \qquad (4)$$

In the formula, Y represents an alkoxy group, an acyloxy group, a hydroxyl group, or a halogen atom, and Ar, $Z^1$ and $Z^2$ have the same meanings as defined above.

In the formula (4), an alkoxy group represented by Y may include a $C_{1-4}$alkoxy group such as methoxy or ethoxy group. Examples of the acyloxy group may include an acyloxy group having about 2 to 5 carbon atoms. Moreover, examples of the halogen atom may include chlorine, bromine, and others.

The compound represented by the formula (4), for example, may include an aralkyl ether such as a xylylene glycol $C_{1-4}$alkyl ether (e.g., p-xylylene glycol dimethyl ether), an acyloxyaralkyl compound such as p-xylylene-α,α'-diacetate, an aralkyldiol such as p-xylylene-α,α'-diol, an aralkyl halide such as p-xylylene-α,α'-dichloride or p-xylylene-α,α'-dibromide. The phenol compound may include a phenol compound or an alkylphenol compound which are exemplified in the section on the novolak resin. These phenol compounds may be used either singly or in combination.

Examples of the aniline compound may include aniline, an alkylaniline (e.g., a $C_{1-20}$alkylaniline such as toluidine or octylaniline), and an N-alkylaniline (e.g., N,N-dimethylaniline). These aniline compounds may be used either singly or in combination.

The ratio of the compound represented by the formula (4) relative to the phenol compound or the aniline compound (the former/the latter) is, for example, about 1/1 to 1/3 (molar ratio), and preferably about 1/1 to 1/2.5 (molar ratio).

The softening point of the aralkyl resin thus obtained is, for example, about 40 to 160° C., preferably about 50 to 150° C., and more preferably about 55 to 140° C. Incidentally, as other aralkyl resin, there may be used an aralkyl resin described in Japanese Patent Application Laid-Open No. 351822/2000 (JP-2000-351822A).

If necessary, the aralkyl resin may be cured or modified. Curing or modification may be usually effected by a conventional method, such as addition polymerization with an alkylene oxide (e.g., ethylene oxide, and propylene oxide), methylene-crosslinking with the use of a polyamine (e.g., hexamethylenetetramine) or epoxy-modification with the use of an epoxy compound (e.g., epichlorohydrin).

(1-3) Aromatic Vinyl Resin

The aromatic vinyl resin may include, for example, a resin having a structural unit represented by the following formula (5):

[Formula 4]

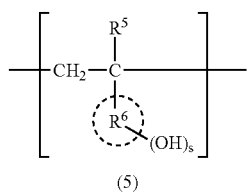

(5)

wherein $R^5$ represents a hydrogen atom or a linear or branched $C_{1-3}$alkyl group, $R^6$ represents an aromatic ring, and "s" denotes an integer of 1 to 3.

In the formula (5), the $C_{1-3}$alkyl group may include methyl group, and others. As the aromatic ring, there may be mentioned a $C_{6-20}$aromatic ring such as benzene ring or naphthalene ring. Incidentally, the aromatic ring may have a substituent (e.g., a hydroxyl group; the alkyl group exemplified in the item on the above-mentioned $R^1$ to $R^3$; the alkoxy group exemplified in the item on the above-mentioned Y).

In the formula (5), the hydroxyl group may be protected by a protecting group such as a metal ion, a silyl group, or an organic group (e.g., an alkyl group, an alkylcarbonyl group, and an arylcarbonyl group (such as benzoyl group)). Moreover, to the hydroxyl group may be added an alkylene oxide (e.g., ethylene oxide, and propylene oxide).

A resin obtained from such a derivative has, for example, a structural unit represented by the following formula (6):

[Formula 5]

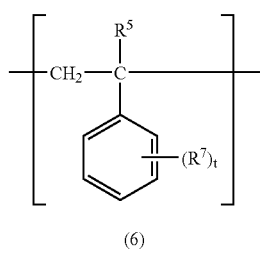

(6)

wherein $R^5$ has the same meaning as defined above; $R^7$ is a group selected from the group consisting of —OH, —OM (M represents a metal cation), —OSi($R^8$)$_3$, —O$R^8$, —OC(=O) $R^8$ ($R^8$ represents a $C_{1-6}$alkyl group or a $C_{6-20}$aryl group) and —O($A^1$O)$_u$H ($A^1$ represents a $C_{1-4}$alkylene group, the repeating number "u" is an integer of 1 to 5); and "t" denotes an integer of 1 to 3.

In the formula (6), the metal cation "M" may be any one of a monovalent cation of an alkali metal (e.g., sodium, lithium, and potassium), a bivalent cation of an alkaline earth metal (e.g., magnesium, and calcium), or a transition metal cation.

In the formula (6), it is sufficient that the substituent $R^7$ is positioned in any one of ortho-position, meta-position or para-position to the main chain. Further, in addition to the substituent $R^7$, a pendant aromatic ring may have a $C_{1-4}$alkyl group as a substituent.

The aromatic vinyl-series resin may include a homo- or copolymer of an aromatic vinyl monomer having a hydroxyl group (e.g., a hydroxyl group-containing monomer such as vinyl phenol or dihydroxystyrene), corresponding to the above-mentioned structural unit (5), or a copolymer with other copolymerizable monomer. These monomers may be used singly or in combination.

Examples of the other copolymerizable monomer include a (meth)acrylic monomer [e.g., (meth)acrylic acid, a (meth) acrylate, (meth)acrylamide, and (meth)acrylonitrile], a styrenic monomer, a polymerizable polycarboxylic acid, a maleimide-series monomer, a diene-series monomer, and a vinyl-series monomer (e.g., a vinyl ester such as vinyl acetate; a vinyl ketone; a vinyl ether; and a nitrogen-containing vinyl monomer such as N-vinylpyrrolidone). These copolymerizable monomers may be used either singly or in combination.

The ratio of the vinyl monomer relative to the copolymerizable monomer is, for example, about 10/90 to 100/0 (% by weight), preferably about 30/70 to 100/0 (% by weight), and more preferably about 50/50 to 100/0 (% by weight).

The preferred aromatic vinyl resin includes a vinylphenol homopolymer (a polyhydroxystyrene), particularly a p-vinylphenol homopolymer.

There is no particular restriction as to the number average molecular weight of the aromatic vinyl-series resin, and it may be selected within the range of, for example, 300 to $50 \times 10^4$, and preferably 400 to $30 \times 10^4$.

(2) Polyarylate-Series Resin

The polyarylate-series resin has a structural unit represented by the following formula (7):

$$[-O-Ar-OC(O)-A^2-C(O)-]  \quad (7)$$

wherein Ar stands for an aromatic group and $A^2$ stands for an aromatic, alicyclic, or aliphatic group.

The polyarylate-series resin may be obtained by a conventional polyesterification reaction, for example, a reaction between an aromatic polyol component and an polycarboxylic acid component (e.g., an aromatic polycarboxylic acid component, an aliphatic polycarboxylic acid component (the aliphatic dicarboxylic acid exemplified in the paragraph of the above-mentioned polyester-series resin (a $C_{2-20}$aliphatic dicarboxylic acid such as adipic acid)), and an alicyclic polycarboxylic acid component (a $C_{3-20}$alicyclic dicarboxylic acid such as cyclohexanedicarboxylic acid)). The polycarboxylic acid component usually contains at least the aromatic polycarboxylic acid component.

As the aromatic polyol (monomer), a diol such as a monocyclic aromatic diol or a polycyclic aromatic diol, or a reactive derivative thereof may be usually employed. These aromatic polyols may be used singly or in combination.

Examples of the monocyclic aromatic diol may include an aromatic diol having about 6 to 20 carbon atoms, such as a benzenediol, xylylene glycol or naphthalenediol. The polycyclic aromatic diol may include a bis(hydroxyaryl) (a bisphenol compound), for example, a bis(hydroxyaryl)$C_{1-6}$alkane such as 4,4'-dihydroxybiphenyl, 2,2'-biphenol, bisphenol A, bisphenol D or bisphenol F; and a bis(hydroxyaryl)$C_{3-12}$cycloalkane. Moreover, the polycyclic aromatic diol may also include a compound having a bis(hydroxyaryl) backbone, such as di(hydroxyphenyl) ether, di(hydroxyphenyl)ketone, di(hydroxyphenyl)sulfoxide, and in addition, di(hydroxyphenyl)thioether, a bis($C_{1-4}$alkyl-substituted hydroxyphenyl)alkane and a terpene diphenol compound.

The preferred aromatic polyol includes a benzenediol compound and a bisphenol compound [for example, a bis(hydroxyaryl)$C_{1-6}$alkane (e.g., bisphenol A, bisphenol F, and bisphenol AD)].

Incidentally, the aromatic polyol may be used together with an aliphatic polyol (a $C_{2-10}$alkylene glycol) or an alicyclic polyol (a polyol having a $C_{3-10}$aliphatic ring, such as 1,4-cyclohexanedimethanol or cyclohexanediol).

Examples of the aromatic polycarboxylic acid may include a monocyclic aromatic dicarboxylic acid, a polycyclic aromatic dicarboxylic acid, or a reactive derivative thereof (for example, an aromatic polycarboxylic acid halide, an aromatic polycarboxylic ester, and an aromatic polycarboxylic acid anhydride).

The monocyclic aromatic dicarboxylic acid may include a benzenedicarboxylic acid such as phthalic acid, phthalic anhydride, isophthalic acid, or terephthalic acid, and an aryl-dicarboxylic acid having carbon atoms of about 8 to 20 (such as naphthalenedicarboxylic acid). Incidentally, the benzenedicarboxylic acid and the naphthalenedicarboxylic acid (particularly, benzenedicarboxylic acid) may have one or two $C_{1-4}$alkyl group(s) as a substituent. Examples of the polycyclic aromatic dicarboxylic acid may include a bis (arylcarboxylic acid), for example, biphenyldicarboxylic acid, a bis(carboxyaryl)$C_{1-6}$alkane; a bis(carboxyaryl)$C_{3-12}$cycloalkane; and a bis(carboxyaryl)ether.

The preferred aromatic polycarboxylic acid component includes the monocyclic aromatic dicarboxylic acid (particularly, a benzenedicarboxylic acid such as phthalic acid, isophthalic acid or terephthalic acid), the bis(carboxyaryl)$C_{1-6}$alkane, and others.

If necessary, an aromatic triol, an aromatic tetraol, an aromatic tricarboxylic acid, an aromatic tetracarboxylic acid, or the like may be used in combination with the aromatic diol and the aromatic dicarboxylic acid.

The preferred polyarylate-series resin includes a polyarylate-series resin in which the aromatic polyol is a bisphenol compound and/or a benzenediol compound, for example, a polyester of a bisphenol compound (e.g., bisphenol A) and/or a benzenediol compound (e.g., resorcinol) and a benzenedicarboxylic acid (e.g., terephthalic acid), a polyester of a bisphenol compound and/or a benzenediol compound and a bis(arylcarboxylic acid) [e.g., a bis(carboxyaryl)$C_{1-4}$alkyl such as bis(carboxyphenyl)propanel, and others. These polyarylate-series resins may be used singly or in combination.

The terminal (or end) of the polyarylate-series resin may be blocked or capped with (bonded to) an alcohol (e.g., an alkyl alcohol, an aryl alcohol, and an aralkyl alcohol), or a carboxylic acid (e.g., an aliphatic carboxylic acid, an alicyclic carboxylic acid, and an aromatic carboxylic acid).

The number average molecular weight of the polyarylate-series resin is, for example, about 300 to $30 \times 10^4$, preferably about 500 to $10 \times 10^4$, and more preferably about 500 to $5 \times 10^4$.

(3) Aromatic Epoxy Resin

Examples of the aromatic epoxy resin may include an ether-series epoxy resin (e.g., a bisphenol-based epoxy resin, and a novolak epoxy resin), and an amine-series epoxy resin formed with an aromatic amine component.

Examples of the bisphenol constituting a bisphenol-based epoxy resin are similar to the bis(hydroxyaryl) listed above. The preferred bisphenol-based epoxy resin may include a glycidyl ether of a bis(hydroxyaryl)$C_{1-6}$alkane, particularly bisphenol A, or the like. Moreover, examples of the bisphenol-based epoxy resin also include a resin having a high molecular weight (that is, a phenoxy resin).

Examples of the novolak resin constituting a novolak epoxy resin may include a novolak resin in which an alkyl group (e.g., a $C_{1-4}$ alkyl group such as methyl group) may be substituted on the aromatic ring (e.g., a phenol-novolak resin, and a cresol-novolak resin).

Examples of the aromatic amine component constituting an amine-series epoxy resin may include a monocyclic aromatic amine (e.g., aniline), a monocyclic aromatic diamine (e.g., diaminobenzene), a monocyclic aromatic aminoalcohol (e.g., aminohydroxybenzene), a polycyclic aromatic diamine (e.g., diaminodiphenylmethane), and a polycyclic aromatic amine.

The number average molecular weight of the epoxy resin is, for example, about 200 to 50,000, preferably about 300 to 10,000, and more preferably about 400 to 6,000 (e.g., about 400 to 5,000). Moreover, the number average molecular weight of the phenoxy resin is, for example, about 500 to 50,000, preferably 1,000 to 40,000, and more preferably about 3,000 to 35,000.

The epoxy resin may be used in a cured state, and the curing is effected by the use of a curing agent, e.g., an amine-series curing agent (e.g., an aliphatic amine such as ethylenediamine, and an aromatic amine such as metaphenylenediamine), a polyaminoamide-series curing agent, an acid and acid anhydride-series curing agent.

These resin components may be used singly or in combination.

(4) Aromatic Nylon

As the aromatic nylon constituting the flame retardant, a resin different in kind from the polyamide resin of the base resin is used. As such a resin, there may be used a compound having a unit represented by the following formula (8):

[Formula 6]

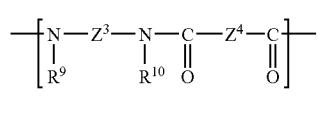

(8)

wherein $Z^3$ and $Z^4$ are the same or different, each selecting from an aliphatic hydrocarbon group, an alicyclic hydrocarbon group, and an aromatic hydrocarbon group, and at least one of $Z^3$ and $Z^4$ is an aromatic hydrocarbon group; $R^9$ and $R^{10}$ are the same or different, each selecting from a hydrogen group, an alkyl group, and an aryl group; or $R^9$ and $R^{10}$ may be connected directly with each other to form a ring.

Such an aromatic nylon may include a polyamide derived from a diamine and a dicarboxylic acid, in which at least one component of the diamine component and the dicarboxylic acid component is an aromatic compound; and a polyamide obtained from an aromatic aminocarboxylic acid, and if necessary a diamine and/or a dicarboxylic acid in combination. The aromatic nylon may also include a copolyamide.

The diamine may include, for example, an aromatic diamine such as phenylenediamine, xylylenediamine (in particular, metaxylylenediamine, paraxylylenediamine), a diamine having a biphenyl backbone, a diamine having a diphenylalkane backbone, or 1,4-naphthalenediamine, and an N-substituted aromatic diamine thereof. Moreover, the aromatic diamine may be used in combination with an alicyclic diamine, an aliphatic amine, and an N-substituted aliphatic diamine thereof, and others. These diamines may be used singly or in combination. As the diamine, it is preferred to use an aromatic diamine (in particular xylylenediamine, N,N'-dialkyl-substituted xylylenediamine).

The dicarboxylic acid may include, for example, a $C_{2-20}$ aliphatic dicarboxylic acid such as adipic acid, suberic acid, sebacic acid, or dodecanedicarboxylic acid; an aromatic dicarboxylic acid such as phthalic acid, or naphthalenedicarboxylic acid; an alicyclic dicarboxylic acid such as cyclohexanedicarboxylic acid; and a dimerized fatty acid. These dicarboxylic acids may be used singly or in combination. As the dicarboxylic acid, it is preferred to use an aliphatic dicarboxylic acid (in particular a $C_{6-20}$ aliphatic dicarboxylic acid such as adipic acid).

As the aromatic or alicyclic aminocarboxylic acid, there may be exemplified phenylalanine, aminobenzoic acid, or the like. These aminocarboxylic acids may be also used singly or in combination.

Moreover, as the aromatic nylon, a condensate of a lactam and/or an $\alpha,\omega$-aminocarboxylic acid may be used insofar as characteristics of a flame retardant is not deteriorated.

The accessory ingredient of the aromatic nylon may include a monobasic acid (for example, acetic acid), a monoamine (for example, butylamine, and benzylamine), a dibasic acid (for example, adipic acid, sebacic acid, terephthalic acid, and isophthalic acid), a diamine (for example, tetramethylenediamine, hexamethylenediamine), a lactam or others, and at least one member selected therefrom may be used as a viscosity adjustment (or viscosity controller).

The aromatic nylon may include a polyamide or copolyamide comprising an aromatic diamine (e.g., xylylenediamine) as a diamine component, preferably a polyamide obtained from an $\alpha,\omega$-$C_{6-12}$ dicarboxylic acid and an aromatic diamine (e.g., metaxylylenediamine, paraxylylenediamine, N,N'-dimethylmetaxylylenediamine, 1,3-phenylenediamine, and 4,4'-diaminodiphenylmethane) [for example, a polyamide obtained from adipic acid and a xylylenediamine (e.g., MXD6, and PMD6), and a polyamide obtained from suberic acid and instead of adipic acid]. These polyamides may be used singly or in combination.

The aromatic nylon is prepared by a direct method under atmospheric pressure or a melt polymerization based on, for example, Japanese Patent Application Laid-Open No. 283179/1987 (JP-62-283179A), Kogyokagaku Zasshi (Journal of the Chemical Society of Japan, Industrial Chemistry) Vol. 74, No. 4, page 786 (1971), Engineering Plastic Jiten (Engineering Plastic Dictionary) page 74 (Gihodo Shuppan Co., Ltd., 1998), and references described in these documents.

The number average molecular weight of the aromatic nylon is not particularly limited to a specific one, and for example may be selected from the range of about 300 to $10 \times 10^4$, and preferably about 500 to $5 \times 10^4$.

(5) Polyphenylene Sulfide-Series Resin

The polyphenylene sulfide-series resin (polyphenylene thioether-series resin) may include a homopolymer or copolymer having a polyphenylene sulfide backbone, —(Ar—S—)— (wherein Ar represents a phenylene group). As the phenylene group (—Ar—), there may be mentioned, for example, p-, m-, or o-phenylene group, a substituted phenylene group (e.g., an alkylphenylene group having substituent(s) such as a $C_{1-5}$ alkyl group, an arylphenylene group having substituent(s) such as phenyl group), —Ar-$A^3$-Ar— [wherein Ar represents a phenylene group, and $A^3$ represents a direct bond between the two Ar groups, or O, CO or $SO_2$]. The polyphenylene sulfide-series resin may be a homopolymer obtained from a homogeneous repeating unit among the phenylene sulfide groups comprising such a phenylene group, or in view of workability of the composition, may be a copolymer containing a heterogeneous repeating unit among the phenylene sulfide groups comprising such a phenylene group.

As the homopolymer, a substantially linear polymer comprising p-phenylene sulfide group as a repeating unit is preferably used. The copolymer may be obtained from two or more different kinds of phenylene sulfide groups among the phenylene sulfide groups. Among others, a copolymer comprising p-phenylene sulfide group as a main repeating unit in combination with m-phenylene sulfide group is preferred. From the viewpoint of physical properties such as heat resistance, moldability, and mechanical property, a substantially linear copolymer comprising not less than 60 mol % (preferably 70 mol %) of p-phenylene sulfide group is particularly preferred.

The polyphenylene sulfide resin may be a polymer obtained by allowing a relative low molecular weight of a linear polymer to crosslink with oxidation or heating for increasing the melt viscosity of the polymer thereby improving molding processability (mold-processability), or a high molecular weight polymer having a substantially linear structure which polymer is obtained by condensation polymerization from a monomer mainly comprising a bifunctional monomer. From the viewpoint of physical properties of the resultant shaped article, a polymer having a substantially linear structure, which is obtained by condensation polymerization is more preferred. Moreover, as the polyphenylene sulfide resin, in addition to the above-mentioned polymer, a branched or crosslinked polyphenylene sulfide resin obtained by a polymerization of the monomer in combination with a monomer having not less than three of functional groups, or a resin-composition obtained by blending the resin to the above-mentioned linear polymer may be also used.

As the polyphenylene sulfide-series resin, there may be used a polyphenylene sulfide or a polybiphenylene sulfide (PBPS), in addition a polyphenylene sulfide ketone (PPSK), a polybiphenylene sulfide sulfone (PPSS), or others. These polyphenylene sulfide-series resins may be used singly or in combination.

The number average molecular weight of the polyphenylene sulfide-series resin is, for example, about 300 to $30 \times 10^4$, and preferably about 400 to $10 \times 10^4$.

(B2) Cyclic Urea-Series Compound or Derivative Thereof

The cyclic urea-series compound comprises at least one urea unit —NHCONH— (including isomers of the urea unit, e.g., —N=C(OH)NH— or —NHC(OH)=N—) as a constituent unit of a ring thereof, and may be any of a monocyclic compound, and a condensed ring or crosslinked ring with an aromatic hydrocarbon ring. The cyclic urea-series compound may include a cyclic ureide (e.g., a cyclic monoureide having one urea unit as a constituent unit of a ring thereof, and a cyclic diureide having two urea units as a constituent unit of a ring thereof). Further, the cyclic urea-series compound may also include a cyclic thiourea compound corresponding to the above-mentioned cyclic urea. These cyclic urea compounds may be used singly or in combination.

As the cyclic monoureide, for example, there may be mentioned an alkyleneurea [e.g., a $C_{1-10}$alkyleneurea such as methyleneurea, ethyleneurea or crotonylideneurea (CDU) (preferably, a $C_{1-6}$alkyleneurea)], an alkenyleneurea (e.g., a $C_{2-10}$alkenyleneurea such as vinyleneurea or cytosine), an alkynyleneurea [e.g., a $C_{2-10}$alkynyleneurea (preferably, a $C_{2-6}$alkynyleneurea)], an aryleneurea, a ureide of a dicarboxylic acid (e.g., parabanic acid, dimethylparabanic acid, barbituric acid, 5,5-diethylbarbituric acid, dilituric acid, dialuric acid, alloxan, alloxanic acid, cyanuric acid, isocyanuric acid, and uramil), a ureide of a β-aldehydic acid (e.g., uracil, 5-methyluracil (thymine), dihydrouracil, urazole, and benzoyleneurea), a ureide of an α-hydroxy acid [e.g., a hydantoin compound such as hydantoin or 5,5-dimethylhydantoin], or a derivative thereof.

As the cyclic diureide, for example, there may be mentioned uric acid, 3-methyluric acid, pseudouric acid, acetyleneurea (glycoluril), a diureide of a α-hydroxy acid [e.g., 1,1-methylenebis(5,5-dimethylhydantoin), and allantoin], a diurea such as p-urazine, a diureide of a dicarboxylic acid (e.g., alloxantin, and purpuric acid), or a derivative thereof.

The acetyleneurea or a derivative thereof may include, for example, a compound represented by the following formula (9). The uric acid or a derivative thereof may include, for example, a compound represented by the following formula (10).

[Formula 7]

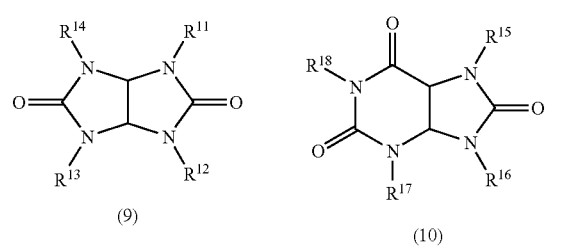

(9)      (10)

Wherein $R^{11}$ to $R^{18}$ are the same or different and each represents a hydrogen atom, an alkyl group, an alkenyl group, an alkoxy group, an acyl group, an acyloxy group, a cycloalkyl group, an aryl group, an arylalkyl group, and others.

The alkyl group may include a $C_{1-8}$(preferably a $C_{1-4}$)alkyl group, the alkenyl group may include a $C_{2-8}$(preferably a $C_{2-4}$)alkenyl group, and the alkoxy group may include a $C_{1-8}$(preferably a $C_{1-4}$)alkoxy group. The acyl group may include a $C_{1-8}$(preferably a $C_{1-4}$)acyl group, the acyloxy group may include a $C_{1-8}$(preferably a $C_{1-4}$)acyloxy group, and the cycloalkyl group may include a $C_{5-16}$(preferably a $C_{5-8}$)cycloalkyl group. The aryl group may include a $C_{6-12}$(preferably a $C_{6-10}$)aryl group, and the arylalkyl group may include a $C_{6-12}$(preferably a $C_{6-10}$)aryl-$C_{1-8}$(preferably $C_{1-4}$)alkyl group. As the acetyleneurea, uric acid, or a derivative thereof, a compound in which $R^{11}$ to $R^{18}$ represent a hydrogen atom or a $C_{1-4}$alkyl group such as methyl group (e.g., acetyleneurea, uric acid, and 3-methyluric acid) is preferred.

Examples of the cyclic thiourea may include ethylenethiourea, thiobarbituric acid, dithiourazole, thiohydantoin, dithiohydantoin, and others.

Moreover, the cyclic urea-series compound (in particular, a cyclic monoureide, or a cyclic diureide) also includes a salt. The salt is not particularly limited to a specific one as long as the cyclic urea-series compound or a derivative thereof can form the salt. For example, the salt may include a salt of the cyclic urea-series compound with at least one member selected from the group consisting of the amino group-containing triazine compound exemplified in the paragraph of the flame retardant (A) (e.g., an amino group-containing triazine compound such as melamine or a melamine condensate), a sulfuric acid, a sulfonic acid, a boric acid, and a metal (e.g., an alkali metal, an alkaline earth metal, zinc, aluminum, and a transition metal). In particular, a salt thereof with the triazine compound is preferred. These salts may be used singly or in combination.

The preferred salt with the triazine compound may include, for example, a salt of acetyleneurea, uric acid, cyanuric acid or isocyanuric acid with a melamine compound (e.g., at least one member selected from the group consisting of melamine, melem, melam, melon, and guanamine); particularly, a melamine salt of cyanuric acid (melamine cyanurate), a melem salt, a melam salt, a melon salt and a guanamine salt, each corresponding to the melamine salt of cyanuric acid (e.g., guanamine cyanurate, acetoguanamine cyanurate, and benzoguanamine cyanurate); a melamine salt of acetyleneurea, and a melem salt, a melam salt, a melon salt and a guanamine salt, each corresponding to the melamine salt of acetyleneurea.

The proportion of the cyclic urea-series compound relative to the salt-forming (salifiable) component is not particularly limited to a specific one, and for example, the former/the latter (molar ratio) is about 1/5 to 4/1, preferably about 1/3 to 2/1, and more preferably about 1/2 to 1/1.

Among these cyclic urea-series compounds, a salt of acetyleneurea, uric acid, melamine or a condensate thereof (e.g., melam, melem, and melon) with cyanuric acid is preferred.

(B3) Amino Group-Containing Triazine Compound

The amino group-containing triazine compound as the flame-retardant auxiliary (B) may include the amino group-containing triazine compound mentioned in the paragraph of the flame retardant (A). The amino group-containing triazine compound (B3) may be used singly or in combination. Among the amino group-containing triazine compounds, the preferred one includes melamine or a derivative thereof [e.g., a melamine condensate such as melamine, melem, or melon (particularly melam and melem)], and guanamine or a derivative thereof [e.g., acetoguanamine, benzoguanamine, adipoguanamine, phthaloguanamine, CTU-guanamine, and a guanamine compound having a heterocycle-containing group as a substituent (e.g., 2,4-diamino-6-(2'-imidazolyl-(1')-alkyl)-s-triazine)].

(B4) Inorganic Metal-Series Compound

The inorganic metal-series compound (B4) may include a metal salt of an inorganic acid, a metal oxide, a metal hydroxide, a metal sulfide, and others. The inorganic metal compound may be any one of an anhydride or a hydrous compound. These inorganic metal compounds may be used singly or in combination. As the inorganic metal compounds, the preferred one includes a metal salt of an inorganic acid (e.g., a metal borate, a metal hydrogen phosphate, a metal stannate, a metal molybdate, and a metal tungstate), a metal oxide, a metal hydroxide, and a metal sulfide. Incidentally, the inorganic metal compound does not include any inorganic filler in practical cases.

As the inorganic acid constituting the metal salt of the inorganic acid, there may be used an oxygen acid having no sulfur atom (excluding a carbonic acid) such as a boric acid, a phosphoric acid, a stannic acid, a molybdic acid, or a tungstic acid. The oxygen acid having no sulfur atom (or sulfur-free oxygen acid) may be a polyacid (e.g., a polyacid containing a metal of the group 5 or 6 of the Periodic Table of Elements). The polyacid may include, for example, an isopolyacid such as isopolychromic acid; a heteropolyacid such as cobaltmolybdate, cobalttungstate, molybdenumtungstate, vanadiummolybdate, or vanadomolybdophosphate.

The metal forming a salt with the inorganic acid may include an alkali metal (e.g., potassium, and sodium); an alkaline earth metal (e.g., magnesium, and calcium); a transition metal [e.g., the metal of the Group 3A of the Periodic Table of Elements (such as scandium); the metal of the Group 4A of the Periodic Table of Elements (such as titanium); the metal of the Group 5A of the Periodic Table of Elements (such as vanadium); the metal of the Group 6A of the Periodic Table of Elements (such as chromium or molybdenum); the metal of the Group 7A of the Periodic Table of Elements (such as manganese); the metal of the Group 8 of the Periodic Table of Elements (such as iron, cobalt, or nickel); and the metal of the Group 1B of the Periodic Table of Elements (such as copper or silver)], the metal of the Group 2B of the Periodic Table of Elements (such as zinc), the metal of the Group 3B of the Periodic Table of Elements (such as aluminum), the metal of the Group 4B of the Periodic Table of Elements (such as tin), and the metal of the Group 5B of the Periodic Table of Elements (such as antimony). These metals may be used singly or in combination.

(Metal Borate)

The boric acid may preferably include a non-condensed boric acid such as orthoboric acid or metaboric acid; a condensed boric acid such as pyroboric acid, tetraboric acid, pentaboric acid or octaboric acid; and a basic boric acid. As the metal, the alkali metal may be used, and it is preferred to use a polyvalent metal such as the alkaline earth metal, the transition metal or the metal of the Group 2B of the Periodic Table of Elements.

The metal borate is usually a hydrous salt and may include, for example, a non-condensed borate [e.g., a non-condensed borate of an alkaline earth metal (such as calcium orthoborate or calcium metaborate); anon-condensed borate of a transition metal (such as manganese orthoborate or copper metaborate); a non-condensed borate of the metal of the Group 2B of the Periodic Table of Elements (such as zinc metaborate), in particular metaborate], a condensed borate [e.g., a condensed borate of an alkaline earth metal (such as trimagnesium tetraborate or calcium pyroborate); a condensed salt of a transition metal (such as manganese tetraborate or nickel diborate); a condensed borate of the metal of the Group 2B of the Periodic Table of Elements (such as zinc tetraborate or cadmium tetraborate)], and a basic borate (e.g., a basic borate of the metal of the Group 2B of the Periodic Table of Elements, such as basic zinc borate). Moreover, a hydrogenborate corresponding to the borate (e.g., manganese hydrogenorthoborate) may be also employed. In particular, a borate of the alkaline earth metal or metal of the Group 2B of the Periodic Table of Elements (a non-condensed or condensed borate), particularly a (hydrous) zinc borate, a (hydrous) calcium borate, is preferred.

(Metal phosphate)

The phosphoric acid may include a non-condensed phosphoric acid such as orthophosphoric acid, metaphosphoric acid, phosphorous acid, or hypophosphorous acid; and a condensed phosphoric acid such as hypophosphoric acid, pyrophosphoric acid, a polyphosphoric acid, a polymetaphosphoric acid salt, or an anhydrous phosphoric acid. Among these phosphoric acids, the non-condensed phosphoric acid is particularly preferred.

The metal may preferably include a polyvalent metal, e.g., an alkaline earth metal, a transition metal, and metals of the groups 2B to 3B of the Periodic Table of Elements, particularly an alkaline earth metal.

As the metal phosphate (or metal salt of a phosphoric acid), there may be mentioned a salt of the phosphoric acid with the polyvalent metal, in addition a hydrogenphosphate corresponding to the polyvalent metal phosphate. The metal salt may be a double (or a triple) salt. Moreover, the metal salt may have a ligand.

As the metal phosphate, there may be used, for example, a pyrophosphate (such as $Ca_2P_2O_7$), a polymetaphosphate (such as $Ca_3(P_3O_9)_2$), a salt of anhydrous phosphoric acid (such as $Ca2(P_4O_{12})$ or $Ca_5(P_3O_{10})_2$), in addition a condensed phosphate (such as $Ca_5(PO_4)_3(OH)$ or $Ca_5(PO_4)_3(F, Cl)$), and there is preferably used a hydrogenphosphate.

Such a hydrogenphosphate may include, for example, a non-condensed hydrogenphosphate such as an alkaline earth metal hydrogenphosphate (e.g., a magnesium hydrogen orthophosphate, and a calcium hydrogen orthophosphate); a transition metal hydrogenphosphate (e.g., manganese hydrogenphosphate, and iron hydrogenphosphate); a hydrogenphosphate of the metal of the Group 2B of the Periodic Table of Elements (such as zinc hydrogenphosphate); a hydrogenphosphate of the metal of the Group 3B of the Periodic Table of Elements (such as aluminum hydrogenphosphate); or a hydrogenphosphate of the metal of the Group 4B of the Periodic Table of Elements [e.g., tin hydrogenphosphate (such as tin dihydrogenphosphate or tin monohydrogenphosphate)]. Among them, a substantially anhydrous metal hydrogenphosphate, particularly an alkaline earth metal hydrogenphosphate [for example, magnesium dihydrogenphosphate, calcium dihydrogenphosphate, calcium monohydrogenphosphate (calcium secondary phosphate ($CaHPO_4$)), barium dihydrogenphosphate, and barium monohydrogenphosphate], is preferred.

(Metal Stannate)

Examples of the stannic acid may include stannic acid, metastannic acid, orthostannic acid, hexahydroxostannic acid, or others. As a metal, there may be exemplified an alkali metal, and a polyvalent metal such as an alkaline earth metal, a transition metal, or the metal of the Group 2B of the Periodic Table of Elements. The metal stannate is usually a hydrous salt and includes, for example, an alkali metal stannate (e.g., sodium stannate, and potassium stannate), an alkaline earth metal stannate (e.g., magnesium stannate), a transition metal stannate (e.g., cobalt stannate), and a stannate of the metal of the Group 2B of the Periodic Table of Elements (e.g., a (hydrous) zinc stannate). Among these metal stannates, a stannate of the metal of the Group 2B of the Periodic Table of Elements, in particular a (hydrous) zinc stannate, is preferred. These metal stannates may be used singly or in combination.

As a metal salt of an inorganic acid (oxygen acid) other than the phosphoric acid, the boric acid and the stannic acid, there may be used various metal salts corresponding to the metal phosphate, the metal borate and the metal stannate.

(Metal Oxide, Metal Hydroxide and Metal Sulfide)

The metal in the metal oxide, the metal hydroxide, and the metal sulfide may include an alkali metal (e.g., Li, Na, and K), an alkaline earth metal (e.g., Mg, Ca, and Ba), and a metal of the group 4A (e.g., Ti, and Zr), a metal of the group 5A (e.g., V), a metal of the group 6A (e.g., Mo, and W), a metal of the group 7A (e.g., Mn), a metal of the group 8 (e.g., Fe, Co, and Ni), a metal of the group 1B (e.g., Cu), a metal of the group 2B (e.g., Zn), a metal of the group 3B (e.g., Al), a metal of the group 4B (e.g., Sn) and a metal of the group 5B (e.g., Sb) of the Periodic Table of Elements.

Examples of the metal oxide may include magnesium oxide, molybdenum oxide, tungstic oxide, titanium oxide, zirconium oxide, tin oxide, copper oxide, zinc oxide, aluminum oxide, nickel oxide, iron oxide, manganese oxide, antimony trioxide, antimony tetraoxide, and antimony pentaoxide.

The metal hydroxide may include, for example, aluminum hydroxide, magnesium hydroxide, tin hydroxide, and zirconium hydroxide.

The metal sulfide may include, for example, zinc sulfide, molybdenum sulfide, and tungsten sulfide. Among these metal sulfides, zinc sulfide is preferred. The metal oxides, the metal hydroxides, and the metal sulfides may be respectively used singly or in combination.

In the combinations of the base resin, the flame retardant (A) and the flame-retardant auxiliary (B), the preferred combination may include, for example, the following combinations (i), (ii), and others.

(i) base resin: a base resin at least comprising the aromatic polyester-series resin, flame retardant (A): a salt of at least one amino group-containing triazine compound selected from the group consisting of melamine and the condensate thereof (melam, melem and/or melon) with at least one member selected from the group consisting of the sulfuric acid and the sulfonic acid, and flame-retardant auxiliary (B): at least one member selected from the group consisting of (a) a salt of cyanuric acid with acetyleneurea, uric acid, melamine or the condensate thereof (melam, melem and/or melon), and (b) melamine or the condensate thereof (melam, melem and/or melon);

(ii) base resin: a base resin at least comprising the polyester-series resin (e.g., the PET, the PBT, a mixture of the PPT and the PET, or a mixture of the PBT and the PET), flame retardant (A): a salt of at least one aminotriazine compound selected from the group consisting of melamine and the condensate thereof with at least one member selected from the group consisting of the sulfuric acid and the sulfonic acid (e.g., an alkanesulfonic acid), and flame-retardant auxiliary (B): the aromatic resin (Bl) (e.g., the aromatic epoxy resin).

[Proportions of Flame Retardant and Flame-Retardant Auxiliary to be Used]

In the flame-retardant resin composition of the present invention, combination use of the sulfate and/or sulfonate of the amino group-containing triazine compound, and the specific flame-retardant auxiliary can impart a high flame retardancy to a wide range of base resins (e.g., a polyester-series resin) without use of a halogen-containing flame retardant and/or an organic phosphorus-containing flame retardant. The proportion of the flame retardant (A) relative to the resin component comprising the base resin and the aromatic resin (B1) may be selected from the range of about 0.1 to 300 parts by weight relative to 100 parts by weight of the resin component, and is usually not more than 200 parts by weight (e.g., about 1 to 200 parts by weight), preferably about 3 to 150 parts by weight, and more preferably about 5 to 100 parts by weight, relative to 100 parts by weight of the resin component.

The proportion of the flame retardant (A) may be about 0.1 to 120 parts by weight, preferably about 1 to 110 parts by weight (e.g., about 5 to 100 parts by weight), and more preferably about 10 to 100 parts by weight (e.g., about 15 to 90 parts by weight), relative to 100 parts by weight of the base resin. Moreover, the proportion of the flame-retardant auxiliary (B) may be about 0.001 to 100 parts by weight (e.g., about 0.001 to 90 parts by weight), and preferably about 0.005 to 80 parts by weight (e.g., about 0.01 to 70 parts by weight), relative to 100 parts by weight of the base resin. The proportion of the flame-retardant auxiliary (B) may be usually about 0.001 to 10 parts by weight (e.g., about 0.001 to 8 parts by weight), and preferably about 0.005 to 7 parts by weight (e.g., about 0.01 to 6 parts by weight), relative to 100 parts by weight of the base resin.

The base resin is usually different from the aromatic resin (B1). In such a case, the proportion (weight ratio) of the base resin relative to the aromatic resin (B1) [the base resin/the aromatic resin] is about 50/50 to 100/0 (e.g., about 50/50 to 99.99/0.01), preferably about 55/45 to 100/0 (e.g., about 55/45 to 99.99/0.01), and more preferably about 60/40 to 100/0 (e.g., about 60/40 to 99.95/0.05).

The proportion (weight ratio) of the flame retardant (A) relative to the flame-retardant auxiliary (B) [the flame retardant (A)/the flame-retardant auxiliary (B)] is about 99/1 to 1/99, preferably about 98/2 to 2/98, and more preferably about 97/3 to 3/97. Moreover, the proportion (weight ratio) of the flame retardant (A) relative to the flame-retardant auxiliary (B) may be, for example, about 99.99/0.01 to 1/99 (e.g., about 99.99/0.01 to 20/80), and preferably about 99.96/0.04 to 10/90 (e.g., about 99.95/0.05 to 20/80). Incidentally, the proportion (weight ratio) of the flame retardant (A) relative to the aromatic resin (B1) may be, for example, about 99.99/0.01 to 20/80, preferably about 99.95/0.05 to 30/70, and more preferably about 99.9/0.1 to 40/60.

It is preferred that the flame-retardant auxiliary (B) usually contains at least one selected from the cyclic urea-series compound or the derivative thereof (B2) and the amino group-containing triazine compound (B3), particularly, at least the component (B2). Incidentally, in the case where the flame-retardant auxiliary (B) contains both the cyclic urea-series compound or the derivative thereof (B2) and the amino group-containing triazine compound (B3), the proportion of the amino group-containing triazine compound (B3) is about 1 to 200 parts by weight, preferably about 5 to 100 parts by weight, and more preferably about 5 to 50 parts by weight, relative to 100 parts by weight of the cyclic urea-series compound (B2).

Moreover, the proportion of the aromatic resin (B1) in the flame-retardant auxiliary (B) may be suitably selected from a range in which flame retardancy can be imparted to the resin, and is, for example, about 0 to 500 parts by weight (e.g., about 0 to 400 parts by weight), preferably about 1 to 400 parts by weight (e.g., about 1 to 300 parts by weight), and more preferably about 1 to 200 parts by weight (e.g., about 2 to 150 parts by weight), relative to 100 parts by weight of tha total amount of the cyclic urea-series compound or the derivative thereof (B2) and the amino group-containing triazine compound (B3). Moreover, the proportion of the inorganic metal-series compound (B4) is about 0 to 300 parts by weight (e.g., about 5 to 200 parts by weight), and preferably about 10 to 150 parts by weight relative to 100 parts by weight of the total amount of the cyclic urea-series compound or the derivative thereof (B2) and the amino group-containing triazine compound (B3).

[Additive]

If necessary, the flame-retardant resin composition of the present invention may comprise a variety of additives (for example, other flame-retardant, an antioxidant, a stabilizer, a dripping inhibitor, a lubricant, and a plasticizer). These additives may be used singly or in combination. The total content of the additive(s) is about 0.01 to 50 parts by weight, preferably about 0.1 to 30 parts by weight, and more preferably about 1 to 20 parts by weight, relative to 100 parts by weight of the base resin.

(Other Flame Retardant)

Incidentally, the flame-retardant resin composition of the present invention may comprise, in order to further impart flame retardancy to the composition, other flame retardant(s), for example, a nitrogen-containing flame retardant, a sulfur-containing flame retardant, a silicon-containing flame retardant, an alcohol-based flame retardant, an intumescent-series (expansive) flame retardant (e.g., an expansive graphite), and others.

The nitrogen-containing flame retardant may include a salt of an amino group-containing triazine compound exemplified in the paragraph of the above-mentioned flame retardant (A), with an oxygen acid other than a sulfuric acid and a sulfonic acid [for example, an oxygen acid not having a sulfur atom (sulfur-free oxygen acid), e.g., a nitric acid, a chloric acid (e.g., chloric acid, chlorous acid, and hypochlorous acid), a boric acid (e.g., a non-condensed boric acid such as orthoboric acid or metaboric acid; and a condensed boric acid such as tetraboric acid or boric anhydride), antimonic acid, molybdic acid, tungstic acid, stannic acid, and silicic acid], and others.

The sulfur-containing flame retardant may include an organic sulfonic acid (for example, an alkanesulfonic acid, a perfluoroalkanesulfonic acid, an arylsulfonic acid, and a sulfonated polystyrene), sulfamic acid, an organic sulfamic acid, a salt of an organic sulfonic acid amide (e.g., an ammonium salt, an alkali metal salt, and an alkaline earth metal salt), and others.

The silicon-containing flame retardant may include a (poly)organosiloxane, for example, a dialkylsiloxane (e.g., dimethylsiloxane), an alkylarylsiloxane (e.g., phenylmethylsiloxane), a diarylsiloxane, and a monoorganosiloxane (for instance, a polydimethylsiloxane, a polyphenylmethylsiloxane); or a copolymer; or others. Moreover, as the (poly)organosiloxane, there may be also used a branched organosiloxane [e.g., trade name "XC99-B5664" (manufactured by Toshiba Silicone Co., Ltd.), trade names "X-40-9243", "X-40-9244" and "X-40-9805" (manufactured by Shin-Etsu Chemical Co., Ltd.), compounds described in Japanese Patent Application Laid-Open No. 139964/1998 (JP-10-139964A)], a modified (poly)organosiloxane (for example, a modified silicone) having substituent(s) such as epoxy group, hydroxyl group, carboxyl group, amino group, and ether group in the end or main chain of the molecule.

Examples of the alcohol-based flame retardant may include a polyhydric alcohol (e.g., pentaerythritol), an oligomeric polyhydric alcohol (e.g., dipentaerythritol, and tripentaerythritol), an esterified polyhydric alcohol, a substituted alcohol, a cellulose compound (e.g., cellulose, hemicellulose, lignocellulose, pectocellulolse, and adipocellulose), and a saccharide compound (e.g., a monosaccharide, and a polysaccharide).

These other flame retardants may be used singly or in combination. The content of other flame retardant may be, for example, selected within the range of about 0.01 to 50 parts by weight, preferably about 0.05 to 30 parts by weight, and particularly about 0.1 to 20 parts by weight, relative to 100 parts by weight of the base resin.

(Antioxidant or Stabilizer)

Moreover, the flame retardant resin composition of the present invention may comprise an antioxidant and/or a stabilizer to maintain thermal stability of the composition for a long term. The antioxidant and the stabilizer may include, for example, a phenol-series (e.g., hindered phenols), amine-series (e.g., hindered amines), phosphorous-series, sulfur-series, hydroquinone-series, or quinoline-series antioxidant (or stabilizer), an inorganic stabilizer, a compound having a functional group reactive to an active hydrogen atom (a reactive stabilizer), and others.

The phenol-series (phenolic) antioxidant may include, for example, a $C_{2-10}$alkylene glycol-bis[3-(3,5-di-t-butyl-4-hydroxyphenyl)propionate]; a di- or trioxy$C_{2-4}$alkylene glycol-bis[3-(3,5-di-t-butyl-4-hydroxyphenyl)propionate]; a $C_{3-8}$alkylene triol-bis[3-(3,5-di-t-butyl-4-hydroxyphenyl)propionate]; a $C_{4-8}$alkylene tetraol-tetrakis[3-(3,5-di-t-butyl-4-hydroxyphenyl)propionate] such as a pentaerythritol-tetrakis[3-(3,5-di-t-butyl-4-hydroxyphenyl)propionate]; and others.

The amine-series antioxidant may include a hindered amine, for example, a tri- or tetra$C_{1-3}$alkylpiperidine or a derivative thereof, a bis (tri-, tetra- or penta$C_{1-3}$alkylpiperidine) $C_{2-20}$alkylenedicarboxylic acid ester [e.g., bis(2,2,6,6- tetramethyl-4-piperidyl)oxalate], 1,2-bis(2,2,6,6-tetramethyl-4-piperidyloxy)ethane, phenylnaphthylamine, N,N'-diphenyl-1,4-phenylenediamine, and N-phenyl-N'-cyclohexyl-1,4-phenylenediamine.

The phosphorus-series (or phosphorus-containing) antioxidant (or stabilizer) may include, for example, triisodecyl phosphite, diphenylisodecyl phosphate, a bis- or tris(t-butylphenyl)phosphate, tris(2-cyclohexylphenyl)phosphate, a bis($C_{1-9}$alkylaryl)pentaerythritol diphosphite [e.g., bis(2,6-di-t-butyl-4-methylphenyl)pentaerythritol diphosphite], a triphenyl phosphate-series stabilizer, a diphosphonite-series stabilizer, and others. The organic phosphorus-containing stabilizer usually has a t-butylpheyl group.

The hydroquinone-series antioxidant may include, for example, 2,5-di-t-butylhydroquinone, and the quinoline-series antioxidant may include, for example, 6-ethoxy-2,2,4-trimethyl-1,2-dihydroquinone. The sulfur-series (or sulfur-containing) antioxidant may include, for example, dilaurylthiodipropionate, distearylthiodiproionate, and others.

The inorganic stabilizer may include an inorganic metal or mineral-series stabilizer (e.g., a hydrotalcite, and a zeolite), and a salt of an alkali metal or alkaline earth metal with a carboxylic acid (e.g., a salt of a carbonic acid (a carbonate), and a salt with an organic carboxylic acid). As the hydrotalcite, hydrotalcites recited in Japanese Patent Application Laid-Open No. 1241/1985 (JP-60-1241A) and Japanese Patent Application Laid-Open No. 59475/1997 (JP-9-59475A), such as hydrotalcite compounds represented by the following formula are usable.

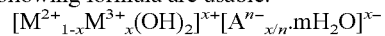

In the formula, $M^{2+}$ represents $Mg^{2+}$, $Mn^{2+}$, $Fe^{2+}$, $Co^{2+}$, or any of other divalent metal ions; $M^{3+}$ represents $Al^{3+}$, $Fe^{3+}$, $Cr^{3+}$, or any of other trivalent metal ions; $A^{n-}$ represents $CO_3^{2-}$, $OH^-$, $HPO_4^{2-}$, $SO_4^{2-}$, or any of other n-valent anions (particularly, monovalent or divalent anion); x is $0<x<0.5$; and m is $0 \leq m < 1$.

These inorganic stabilizers may be used singly or in combination. Incidentally, the hydrotalcite is available from Kyowa Chemical Industry Co., Ltd. under the trade name "DHT-4A", "DHT-4A-2", or "Alcamizer". The zeolite is not particularly limited to a specific one, and for example, a zeolite recited in Japanese Patent Application Laid-Open No. 62142/1995 (JP-7-62142A) may be employed. Incidentally, A-type zeolite is available as "ZEOLAM-series (A-3, A-4, A-5)", "ZEOSTAR-series (KA100P, NA-100P, CA-100P)" or others, X-type zeolite as "ZEOLAM-series (F-9)", "ZEOSTAR-series (NX-100P)" or others, and Y-type zeolite as "HSZ-series (320NAA)" or others, from Tosoh Corp. or Nippon Chemical Industrial Co., Ltd.

The salt of the alkali metal or alkaline earth metal with the carboxylic acid may include, for example, a carbonate (e.g., magnesium carbonate, and (light/colloidal/heavy) calcium carbonate), a salt of an organic carboxylic acid [for example, a salt of a fatty acid (e.g., lithium acetate, sodium acetate, potassium acetate, magnesium acetate, calcium acetate, lithium stearate, sodium stearate, potassium stearate, magnesium stearate, calcium stearate, and calcium 12-hydroxystearate), and a salt of an aromatic carboxylic acid (e.g., lithiumbenzoate, sodium benzoate, potassium benzoate., magnesium benzoate, and calcium benzoate)].

The reactive stabilizer may include a compound having a functional group reactive to an active hydrogen atom. As the compound having a functional group reactive to an active hydrogen atom, there may be exemplified a compound having at least one functional group selected from a cyclic ether group, an acid anhydride group, an isocyanate group, an oxazoline group (or ring), an oxazine group (or ring), a carbodiimide group, and others. These reactive stabilizers may be used singly or in combination.

Examples of the compound having a cyclic ether group may include a compound having an epoxy group or an oxetane group. The compound having an epoxy group may include, for example, an alicyclic compound (e.g., vinylcyclohexene dioxide); a glycidyl ester compound (e.g., glycidyl versatate, glycidyl benzoate, and diglycidyl terephthalate); a glycidyl ether compound (e.g., hydroquinone diglycidyl ether, and bisphenol A glycidyl ether); a glycidyl amine compound; an epoxy group-containing vinyl copolymer; an epoxidized polybutadiene; a copolymer of an epoxidized diene-series monomer and styrene; a triglycidyl isocyanurate; an epoxy-modified (or epoxy-containing) (poly)organosiloxane; and others. The compound having an oxetane group may include, for example, an oxetanyl ester compound such as [1-ethyl(3-oxetanyl)]methyl stearate, [1-ethyl(3-oxetanyl)]methyl versatate, [1-ethyl(3-oxetanyl)]methyl benzoate, or di[1-ethyl(3-oxetanyl)]methyl (o-, m-, or p-)phthalate; an oxetanyl ether compound [for example, an alkyloxetanyl compound such as di[1-ethyl(3-oxetanyl)]methyl ether, an aryloxetanyl compound such as 3-ethyl-3-(phenoxymethyl)oxetane, an aralkyl oxetanyl ether compound, a bisphenol-based oxetane resin such as bisphenol-A di[1-ethyl(3-oxetanyl)]methyl ether, and a novolak oxetane resin]; an oxetane-modified (poly)organosiloxane; and an alkyloxetanyl methyl derivative (for example, [1-methyl(3-oxetanyl)] methyl derivative) which corresponds to the above-mentioned derivative having an oxetanyl unit {for example, a [1-ethyl(3-oxetanyl)]methyl derivative).

The compound having an acid anhydride group may include, for example, an olefinic resin having a maleic anhydride group (e.g., an ethylene-maleic anhydride copolymer, and a maleic anhydride-modified polypropylene), and others. Examples of the compound having an isocyanate group may include an aliphatic isocyanate such as hexamethylene diisocyanate, an alicyclic isocyanate such as isophorone diisocyanate, an aromatic isocyanate such as diphenylmethane isocyanate, a modified product thereof (e.g., a trimer of isophorone diisocyanate), and others.

The compound having an oxazoline group may include, for example, a bisoxazoline compound such as 2,2'-phenylenebis (2-oxazoline), and a vinyl-series resin having an oxazoline group (e.g., a vinyloxazoline-modified styrenic resin). The compound having an oxazine group may include, for example, a bisoxazine compound such as 2,2'-bis(5,6-dihydro-4H-1,3-oxazine).

As the compound having a carbodiimide group, there may be mentioned, for example, a polyarylcarbodiimide such as a poly(phenylcarbodiimide), a polyalkylarylcarbodiimide such as a poly(2-methyldiphenylcarbodiimide), and a poly[alkylenebis(alkyl or cycloalkylaryl)carbodiimide] such as a poly[4,4'-methylenebis(2,6-diethylphenyl)carbodiimide.

These antioxidants and/or stabilizers may be used singly or in combination. The each contents of the antioxidant and the stabilizer may be, for example, selected from the range of about 0 to 10 parts by weight (e.g., about 0.01 to 10 parts by weight), preferably about 0.05 to 8 parts by weight, and particularly about 0.1 to 5 parts by weight, respectively, relative to 100 parts by weight of the base resin. Moreover, the proportion of the antioxidant may be about 0 to 3 parts by weight (e.g., about 0.01 to 2 parts by weight), and preferably about 0.01 to 1 part by weight, relative to 100 parts by weight of the base resin. The proportion of the stabilizer may be about 0 to 10 parts by weight (e.g., about 0.01 to 8 parts by weight), and preferably about 0.01 to 6 parts by weight, relative to 100 parts by weight of the base resin.

To the flame-retardant resin composition of the present invention may be added a dripping inhibitor such as a fluorine-containing resin. The fluorine-containing resin may include a homo- or copolymer of a fluorine-containing monomer, a copolymer of the fluorine-containing monomer and a copolymerizable monomer (e.g., ethylene, and propylene); for example, a homopolymer such as a polytetrafluoroethylene, a polychlorotrifluoroethylene, or a polyvinylidene fluoride, and a copolymer such as a tetrafluoroethylene-hexafluoropropylene copolymer, a tetrafluoroethylene-perfluoroalkylvinyl ether copolymer, or an ethylene-tetrafluoroethylene copolymer. These fluorine-containing resins may be used singly or in combination.

The fluorine-containing resin may be used in the form of particles, and the mean particle size may for example be about 10 to 5,000 µm, preferably about 100 to 1,000 µm, and more preferably about 100 to 700 µm.

The content of the dripping inhibitor (e.g., the fluorine-containing resin) is, for example, about 0 to 5 parts by weight (e.g., about 0.01 to 5 parts by weight), preferably about 0.1 to 3 parts by weight, and more preferably about 0.1 to 2 parts by weight, relative to 100 parts by weight of the base resin.

The composition of the present invention may be further improved in formability (or moldability) by further adding a lubricant and/or a plasticizer.

The lubricant may include (a) a long chain fatty acid or a derivative thereof, (b) a polyoxyalkylene glycol, (c) a silicone-series compound, (d) a wax, and others. These lubricants may be used singly or in combination.

(a) Long Chain Fatty Acid or Derivative Thereof

The long chain fatty acid may be a saturated fatty acid or an unsaturated fatty acid. Moreover, a long chain fatty acid in which a part of hydrogen atoms is replaced with substituent(s) such as hydroxyl group(s) may be used. Such a long chain fatty acid may include a monovalent or divalent fatty acid having a carbon atom of not less than 10, for example, a monovalent saturated fatty acid having a carbon atom of not less than 10 (e.g., a $C_{10-34}$ saturated fatty acid such as capric acid, lauric acid, myristic acid, pentadecylic acid, palmitic acid, stearic acid, arachidic acid, behenic acid, or montanic acid), a monovalent unsaturated fatty acid having a carbon atom of not less than 10 (e.g., a $C_{10-34}$ unsaturated fatty acid such as oleic acid, linoleic acid, linolenic acid, arachidonic acid, or erucic acid), and a divalent fatty acid (a bibasic fatty acid) having a carbon atom of not less than 10 (e.g., a divalent $C_{10-30}$ saturated fatty acid such as sebacic acid, dodecanoic diacid, tetradecanoic diacid, or thapsic acid; and a divalent $C_{10-30}$ unsaturated fatty acid such as decenoic diacid, or dodecenoic diacid). The fatty acid may also include a fatty acid having one or a plurality of hydroxyl group(s) in a molecule thereof (e.g., a hydroxy-saturated $C_{10-26}$ fatty acid such as 12-hydroxystearic acid). Among these fatty acids, a monovalent $C_{10-26}$ saturated or unsaturated fatty acid, and a divalent $C_{10-20}$ saturated or unsaturated fatty acid are preferred.

The derivative of the long chain fatty acid may include a fatty acid ester and a fatty acid amide, and others. The structure of the fatty acid ester is not particularly limited to a specific one, the fatty acid ester may be either a linear or a branched one. Examples of the fatty acid ester may include an ester of a long chain fatty acid with an alcohol (e.g., an ester having one or a plurality of ester bond(s), such as a mono- to triester). The alcohol constituting the long chain fatty acid ester may be a monohydric alcohol, and usually, preferably a polyhydric alcohol.

The polyhydric alcohol may include a polyhydric alcohol having a carbon atom of about 2 to 8 and preferably of about 2 to 6, or a polymer thereof, for example, a diol such as an alkylene glycol (e.g., ethylene glycol, diethylene glycol, and propylene glycol); a triol such as glycerin, trimethylolpropane, or a derivative thereof; a tetraol such as pentaerythritol, sorbitan, or a derivative thereof; and a homo- or copolymer of such a polyhydric alcohol (e.g., a homo- or copolymer of a polyoxyalkylene glycol such as a polyethylene glycol or a polypropylene glycol, and a polyglycerin). The average degree of polymerization of the polyoxyalkylene glycol is not less than 2 (e.g., about 2 to 500), preferably about 2 to 400 (e.g., about 2 to 300), and more preferably not less than 16 (e.g., about 20 to 200). Incidentally, in the case of using the polyoxyalkylene glycol as the polyhydric alcohol, it is preferred to use, as the long chain fatty acid constituting the ester, a fatty acid having a carbon atom of not less than 12, e.g., a monovalent $C_{12-26}$ saturated or unsaturated fatty acid, and a divalent $C_{12-20}$ saturated or unsaturated fatty acid.

Examples of such a fatty acid ester may include ethylene glycol distearate, glycerin monostearate, glycerin tripalmitate, a polyglycerin tristearate, trimethylolpropane monopalmitate, pentaerythritol monoundecylate, sorbitan monostearate; and a monolaurate, monopalmitate, monostearate, dilaurate, dipalmitate, distearate, dibehenate, dimontanate, dioleate and dilinoleate of a polyalkylene glycol (e.g., a polyethylene glycol, and a polypropylene glycol).

Among the derivatives, as the fatty acid amide, an acid amide (e.g., a monoamide, and a bisamide) of the long chain fatty acid (the monovalent or divalent long chain fatty acid) with an amine (e.g., a monoamine, a diamine, and a polyamine) may be used. Among the acid amides, the bisamide is particularly preferred.

The monoamide may include, for example, a primary acid amide of a saturated fatty acid, such as capric acid amide, lauric acid amide, myristic acid amide, palmitic acid amide, stearic acid amide, arachidic acid amide, or behenic acid amide; a primary acid amide of an unsaturated fatty acid, such as oleic acid amide; a secondary acid amide of a saturated and/or unsaturated fatty acid with a monoamine, such as stearylstearic acid amide, or stearyloleic acid amide; and others.

Examples of the bisamide may include a bisamide of a $C_{1-6}$ alkylenediamine (particularly, a $C_{1-2}$ alkylenediamine) with the above-mentioned fatty acid, for example, ethylenediamine-distearic acid amide (e.g., ethylenebisstearyl amide), hexamethylenediamine-distearic acid amide, ethylenediamine-dioleic acid amide, ethylenediamine-dierucic acid amide, and others. Moreover, as the bisamide, a bisamide in which different acyl groups bond to an amine site of the alkylenediamine, such as ethylenediamine- (stearic acid amide) oleic acid amide, may be also used.

(b) Polyoxyalkylene Glycol

The polyoxyalkylene glycol may include a homo- or copolymer of an alkylene glycol [for example, a $C_{2-6}$ alkylene glycol such as ethylene glycol, propylene glycol, or tetramethylene glycol (preferably a $C_{2-4}$ alkylene glycol)], a derivative thereof, and others.

The concrete examples of the polyoxyalkylene glycol may include a poly$C_{2-6}$ oxyalkylene glycol such as a polyethylene glycol, a polypropylene glycol, or a polytetramethylene glycol (preferably a poly$C_{2-4}$ oxyalkylene glycol), a polyoxyethylene-polyoxypropylene copolymer (e.g., a random or block copolymer), a polyoxyethylene polyoxypropylene glyceryl ether, and a polyoxyethylene polyoxypropylene monobutyl ether.

(c) Silicone-Series Compound

The silicone-series compound may include a (poly)organosiloxane. The (poly)organosiloxane may include a monoorganosiloxane such as a dialkylsiloxane (e.g., dimethylsiloxane), an alkylarylsiloxane (e.g., phenylmethylsiloxane), or a diarylsiloxane (e.g., diphenylsiloxane), a homopolymer thereof (e.g., a polydimethylsiloxane, and a polyphenylmethylsiloxane) or a copolymer thereof. Moreover, the (poly)organosiloxane may include a modified (poly)organosiloxane (e.g., a modified silicone) having a substituent (such as epoxy group, hydroxyl group, carboxyl group, amino group or ether group) at a terminal or a main chain in a molecule thereof.

(d) Wax

The wax may include a natural paraffin, a synthetic paraffin, a micro wax, a polyolefinic wax, and others. The polyolefinic wax may include a poly$C_{2-4}$olefinic wax such as a polyethylene wax or a polypropylene wax, an olefin copolymer wax such as an ethylene copolymer wax, and others, and may also include a partially oxidized matter thereof or a mixture thereof.

The olefin copolymer wax may include, for example, a copolymer of an olefin (e.g., an a-olefin such as ethylene, propylene, 1-butene, 2-butene, isobutene, 3-methyl-1-butene, 4-methyl-1-butene, 2-methyl-2-butene, 4-methyl-1-pentene, 1-hexene, 2,3-dimethyl-2-butene, 1-heptene, 1-octene, 1-nonene, 1-decene, or 1-dodecene), and a copolymer of such an olefin and a copolymerizable monomer. Examples of the copolymerizable monomer may include a polymerizable monomer such as an unsaturated carboxylic acid or an acid anhydride thereof [e.g., maleic anhydride, and (meth)acrylic acid], or a (meth)acrylic acid ester [e.g., a $C_{1-10}$alkyl(meth)acrylate such as methyl(meth)acrylate, ethyl(meth)acrylate, propyl(meth)acrylate, butyl(meth)acrylate, or 2-ethylhexyl(meth)acrylate (preferably a $C_{1-4}$alkyl(meth)acrylate)]. Incidentally, these copolymers may be a random copolymer, a block copolymer, and a graft copolymer. As the olefin copolymer wax, a copolymer of ethylene and at least one monomer selected from the group consisting of other olefin and a polymerizable monomer is preferred.

Moreover, the content of the lubricant may be about 0 to 2 parts by weight (about 0.01 to 2 parts by weight), and preferably about 0.05 to 1.5 parts by weight, relative to 100 parts by weight of the base resin.

The plasticizer may include a polyester-series compound [e.g., (di)ethylene glycol dibenzoate, 2-methyl-1,3-dihydroxypropane dibenzoate, neopentyl glycol dibenzoate, a polyethylene glycolmono-or dibenzoate, a polycaprolactone mono- or dibenzoate; and a long chain fatty acid ester of a $C_{1-3}$alkylene oxide (e.g., ethylene oxide, and propylene oxide) adduct of a biphenol or bisphenol compound (e.g., bisphenol A)], an adipic acid ester compound (e.g., di-2-ethylhexyladipate), a citric acid ester-series compound, a phthalic acid ester-series compound (e.g., di-2-ethylhexyl phthalate), a tetrahydrophthalic acid ester-series compound, a trimellitic acid ester-series compound (e.g., tri-2-ethylhexyl trimellitate), an ether-series compound [e.g., a $C_{1-3}$alkylene oxide (e.g., ethyleneoxide and propyleneoxide) adduct of a biphenol or bisphenol compound (e.g., bisphenol A)], a phosphoric ester-series compound (e.g., an alkyl ester such as trimethyl phosphate; an aryl ester such as tricresyl phosphate, or cresyl diphenyl phosphate; and a bisphenol-series aromatic condensed phorphoric ester). These plasticizers may be used singly or in combination.

The content of the plasticizer is, for example, about 0 to 20 parts by weight (e.g., about 0.01 to 20 parts by weight), and preferably about 0 to 10 parts by weight (e.g., about 0.01 to 10 parts by weight), relative to 100 parts by weight of the base resin.

Further, the flame-retardant resin composition of the present invention may contain other additive(s), for example, a stabilizer (e.g., an ultraviolet ray absorbing agent, a heat stabilizer, and a weather-resistant stabilizer), a mold-release-agent (releasing agent), a coloring agent, an impact resistance improver (impact modifier), a slip- (friction/wear) improving agent, and others.

[Filler]

The flame-retardant resin composition of the present invention may be modified with the use of a filler [for example, a fibrous filler, and a non-fibrous filler (such as a plate-like one or a particulate one)]to further improve mechanical strength, rigidity, thermal stability, electrical property and others.

As the fibrous filler, there may be mentioned a glass fiber, an asbestos fiber, a carbon fiber, a silica fiber, a silica-alumina fiber, a zirconia fiber, a potassium titanate fiber, a metal fiber, and an organic fiber having high melting point.

Among the non-fibrous fillers, the plate-like filler may include, for example, a glass flake, a mica, a graphite, a variety of metal foil, and others. The particulate filler includes a carbon black, a silica, a powder of quartz, a glass bead, a glass powder, a milled fiber, a silicate [e.g., a calcium silicate, an aluminum silicate, a kaolin, a talc, a mica, a clay, a diatomite, and a wollastonite], a metal carbonate (e.g., a calcium carbonate, and a magnesium carbonate), a metal sulfate (e.g., a calcium sulfate, and a barium sulfate), and a metal powder such as a silicon carbide. The preferred filler may include a fibrous filler (e.g., a glass fiber, and a carbon fiber), a non-fibrous filler (e.g., a particulate or plate-like filler, in particular a glass bead, a mild fiber, a kaolin, a talc, a mica, and a glass flake). The particularly preferred filler may include a glass filler, e.g., a glass fiber (e.g., chopped strand).

The proportion of the filler in the flame-retardant resin composition is, for example, about 1 to 60% by weight, preferably about 1 to 50% by weight, and more preferably about 1 to 45% by weight. The proportion of the filler may be, for example, about 0 to 100 parts by weight (e.g., about 0.1 to 100 parts by weight), preferably about 10 to 100 parts by weight (e.g., about 30 to 90 parts by weight), and more preferably about 35 to 80 parts by weight, relative to 100 parts by weight of the base resin. Moreover, the proportion of the filler may be about 0 to 30 parts by weight (e.g., about 0.01 to 30 parts by weight), and preferably about 0.1 to 25 parts by weight.

If necessary, the filler may be treated with a sizing agent or surface-treatment agent (e.g., a functional compound such as an epoxy-series compound, silane-series compound, or a titanate-series compound, preferably an epoxy-series compound such as a bisphenol A-based epoxy resin, or a novolak epoxy resin). The time to treat the filler may be the same time with addition thereof, or the time precedent to addition thereof. Moreover, the amount of the functional surface-treatment agent or sizing agent to be used is about not more than 5% by weight, and preferably about 0.05 to 2% by weight relative to the filler.

The resin composition of the present invention may comprise at least one member selected from the group constituting of the antioxidant, the stabilizer, the dripping inhibitor, the lubricant, the plasticizer, and the filler, in addition to the above-mentioned essential components (the base resin, the flame retardant (A) and the flame-retardant auxiliary (B1)).

The flame-retardant resin composition of the present invention may be a particulate mixture or a molten mixture, and it may be prepared by mixing (or melt-kneading) the base resin with the flame retardant, the flame-retardant auxiliary, and if necessary, the dripping inhibitor or other additive(s) in a conventional manner. The flame-retardant resin composition may be in the form of a pellet. Incidentally, as a production process of pellets with an extruder, for example, the following process is available: a production process comprising precedently melt-mixing all components except for a brittle or fragile filler (such as a glass-series filler), and then mixing the brittle or fragile filler with the mixture.

Incidentally, for imparting handling, it is usable the master batch prepared by melt-mixing a non-resinous component(s) and a resinous component(s). The flame-retardant resin composition can be produced by melt-mixing the master batch, the base resin, and if necessary the residual component(s).

Moreover, the flame-retardant resin composition may be produced by mixing the base resin, the flame retardant (A), and the flame-retardant auxiliary (B).

The present invention also ensures improvement in the electrical property (e.g., tracking resistance) of the shaped article. Therefore, the present invention also includes a method for improving (or enhancing) at least one property selected from the group consisting of flame retardancy, bleed out resistance and electrical properties (e.g., tracking resistance).

The shaped article (molded article, shaped member) of the present invention may be formed from the flame-retardant resin composition.

The shaped article of the present invention has both flame retardancy and electrical property. That is, the shaped article may have a comparative tracking index of not less than 300 V (e.g., about 300 to 1000 V), preferably not less than 350 V (e.g., about 350 to 900 V), and more preferably about 400 to 800 V as the electrical property. Moreover, the shaped article may have a flame-retardant performance of V-2, V-1 or V-0 in a flame retardancy test measured by using a test piece having a thickness of 0.8 mm in accordance with UL94 as the flame retardancy.

The present invention also includes a process for producing a shaped article which comprises injection molding a flame-retardant resin composition comprising the base resin, the flame retardant (A), and the flame-retardant auxiliary (B).

INDUSTRIAL APPLICABILITY

The flame-retardant resin composition of the present invention can be melt-kneaded and shaped or molded by a conventional method such as extrusion molding, injection molding, or compression molding, and is excellent in flame retardancy and molding processability, and the resin composition (thus formed shaped article) may be utilized for various purposes. For example, the shaped article is suitable for an electric and/or electronic device part, a household electrical appliance part, an office automation (OA) device part, a mechanical device part, an automotive part, a packaging material or a case, and others. Moreover, the shaped article of the present invention is concretely usable for a connector part, a switch part, a relay part, a transformer part, a breaker part, an electromagnetic switch device part, a focus case part, a capacitor part, a motor part, a copying machine part, a printer part, and others.

EXAMPLES

The following examples are intended to describe this invention in further detail and should by no means be interpreted as defining the scope of the invention.

Incidentally, flame retardancy and blooming properties of a resin composition were evaluated on the basis of the following tests.

(Evaluation of Flame Retardancy)

In accordance with UL94, the flame retardancy was evaluated using a test piece 3.2 mm thick (Examples 1 to 15 and Comparative Examples 1 to 8). Incidentally, in Examples 16 to 34 and Comparative Examples 9 to 17, the flame retardancy based on UL94 was evaluated using a test piece 0.8 mm thick.

(Evaluation of Blooming Properties)

A test piece 1.6 mm thick for burning was heated at 150° C. for 5 hours, and visually observed for the state of bleeding out in the surface of the test piece. The blooming properties were evaluated on the basis of the following judgmental standard.

"A": no bleeding out was observed
"B": slight bleeding out was observed
"C": remarkable bleeding out was observed (Tracking Resistance)

In accordance with IEC112 standard, comparative tracking index (V) was measured by using a flat plate (70 mm×50 mm×3 mm), and electrical property (or insulating property) was evaluated.

Moreover, components used in Examples and Comparative Examples are shown as follows.

[Base Resin R]

R-1: Polybutylene terephthalate ["DURANEX", intrinsic viscosity=1.0, manufactured by Polyplastics Co., Ltd.]

R-2: Polyethylene terephthalate ["BELLPET EFG 10", manufactured by Kanebo, Ltd.]

R-3: Acrylonitrile-styrene copolymer ["CEVIAN N JD", manufactured by Daicel Chemical Industries, Ltd.]

R-4: Polypropylene terephthalate [prepared by polycondensation of dimethyl terephthalate and 1,3-propanediol; intrinsic viscosity=1.0]

[Flame retardant (salt of amino group-containing triazine compound with sulfuric acid or sulfonic acid) A]

A-1: Melamine sulfate [a material obtained by heat-treating "APINON-901" (manufacture by Sanwa Chemical Co., Ltd.) at 200° C. for 2 hours under a nitrogen flow: incidentally, the heat-treated material had a thermal weight decrease of not larger than 1% by weight by thermogravimetry when the material was heated with increasing a temperature from 30° C. to 250° C. at a ΔT of 20° C./minute under a nitrogen flow by using a calorimetric analysis apparatus (Perkin-Elmer TGA-7)]

A-2: Melam methanesulfonate ["MMS-200", manufactured by Nissan Chemical Industries, Ltd.]

Compound Used in Comparative Examples

A-3: Resorcinol bis(diphenyl phosphate) ["REOFOS RDP", manufactured by Ajinomoto-Fine-Techno Co., Inc.]

A-4: Melamine sulfate ["APINON-901", manufacture by Sanwa Chemical Co., Ltd., which had a thermal weight decrease of 9.1% by weight by thermogravimetry]

[Flame-Retardant Auxiliary B]

[Aromatic Resin (B1)]

B1-1: Novolak phenol resin [dimerless phenol-novolak resin, "PR-53647", manufactured by Sumitomo Durez Co., Ltd]

B1-2: Glycidylated novolak resin ["EPPN", manufactured by Nippon Kayaku Co., Ltd.]

B1-3: Bisphenol A-based epoxy resin ["EPIKOTE 1004K", manufactured by Yuka Shell Epoxy K.K.]

[Cyclic urea-series compound or derivative thereof (B2)]

B2-1: Melamine cyanurate ["MC610", manufactured by Nissan Chemical Industries, Ltd.]

B2-2: Acetyleneurea [manufactured by Tokyo Kasei Kogyo Co., Ltd.]

[Amino Group-Containing Triazine Compound (B3)]
B3-1: Melem [manufactured by Nissan Chemical Industries, Ltd.]
[Inorganic Flame Retardant (B4)]
B4-1: Zinc borate ["FireBrake ZB", manufactured by Borax Japan Ltd.]
B4-2: Anhydrous dibasic calcium phosphate: mean particle size=about 30 μm [manufactured by Taihei Chemical Industrial Co., Ltd.]
[Antioxidant C]
Pentaerythritol tetrakis[3-(3,5-di-t-butyl-4-hydroxyphenyl)propionate] ["IRGANOX 1010", manufactured by Ciba-Geigy Ltd]
[Stabilizer D]
[Phosphorus-Series Stabilizer D1]
D1-1: Tetrakis(2,4-di-t-butylphenyl)-4,4'-biphenylene diphosphonite ["SANDOSTAB P-EPQ", manufactured by Sandoz.]
D1-2: Bis(2,6-di-t-butyl-4-methylphenyl)pentaerythritol diphosphite ["ADKSTAB PEP36", manufactured by Adeka Argus Chemical Co., Ltd.]
D1-3: Sodium dihydrogenphosphate dihydrate
[Reactive Stabilizer D2]
D2-1: Glycidyl benzoate
D2-2: Glycidyl versatate
[Inorganic Stabilizer D3]
D3-1: Sodium stearate
D3-2: Calcium carbonate
[Dripping Inhibitor E]
Polytetrafluoroethylene
[Lubricant F]
F-1: Montanic acid ester ["LICOLUB WE4", manufactured by Clariant Ltd.]
F-2: Montanic acid ester ["LUZA WAX-P", manufactured by Toyo-Petrolite Co., Ltd.]

[Plasticizer G]
G-1: Tri-2-ethylhexyltrimellitate ["TOTM", manufactured by Daihachi Chemical Industry Co., Ltd.]
G-2: Polycaprolactone dibenzoate ["PLACCEL", manufactured by Daicel Chemical Industries, Ltd.]
G-3: Polydimethylsiloxane ["TORAYFIL", manufactured by Dow Corning Toray Silicone Co., Ltd.]
[Filler H]
Glass-chopped strand being 10 μm in diameter and 3 mm long Examples 1 to 15 and Comparative Examples 1 to 8

The above components were mixed in the ratio (parts by weight) described in Tables 1 and 2, and the mixture was kneaded with the use of a small extruder ["Laboplastmill 4C150" manufactured by Toyo Seiki Seisaku-sho, Ltd.] to prepare a resin composition. The obtained resin composition was subjected to injection molding by an injection molding machine to make shaped articles for test. The properties were evaluated with the use of the test shaped articles. The results are shown in Tables 1 and 2.

Examples 16 to 35, and Comparative Examples 9 to 17

The components shown in Tables 3 and 4 were mixed in the ratio (parts by weight) described in Tables 3 and 4, and the mixture was extruded by a 30 mmφ biaxial extruder ["TEX30" manufactured by Japan Steel Works, Ltd.] to prepare a resin composition. The resin composition was subjected to injection molding by an injection molding machine to make shaped articles for test. The properties were evaluated with the use of the test shaped articles. The results are shown in Tables 3 and 4.

TABLE 1

| | | Examples | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Base resin R | R-1 | 50 | 50 | 50 | 50 | 50 | 50 | 50 | 50 | 50 | — | — | — | — | — | — |
| | R-2 | 50 | 50 | 50 | 50 | 50 | 50 | 50 | 50 | 50 | 100 | 100 | 100 | 100 | 100 | 90 |
| | R-3 | — | — | — | — | — | — | — | — | — | — | — | — | — | — | 10 |
| Flame retardant A | | A-1 40 | A-1 40 | A-1 40 | A-1 40 | A-2 40 | A-1 40 | A-1 40 | A-1 40 | A-1 40 | A-1 40 | A-1 40 | A-1 40 | A-2 40 | A-1 40 | A-1 40 |
| Flame-retardant auxiliary B | B2 | B2-1 40 | B2-1 40 | B2-1 40 | B2-1 40 | B2-1 40 | B2-1 35 B2-2 5 | B2-1 35 | B2-1 40 | B2-1 40 | B2-1 40 | B2-1 40 | B2-1 40 | B2-1 40 | B2-1 35 B2-2 5 | B2-1 40 |
| | B1-B3 | B1-1 15 | B1-2 5 | B1-3 3 | — | — | — | B3-1 5 | B4-1 15 | B4-2 25 | B1-3 3 | — | — | — | — | — |
| Antioxidant C | | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| Stabilizer D | D1 | D1-1 0.5 | D1-1 0.5 | — | D1-2 0.5 | D1-2 0.5 | D1-3 0.5 | D1-2 0.5 | D1-2 0.5 | D1-2 0.5 | — | D1-2 0.5 | D1-1 0.5 | D1-2 0.5 | D1-1 0.5 | D1-2 0.5 |
| | D2 | — | — | D2-1 1.0 | — | — | — | — | — | — | D2-2 1.0 | — | — | — | — | — |
| | D3 | — | — | D3-1 0.05 | — | — | — | — | — | — | D3-1 0.05 | — | — | — | — | — |
| Dripping inhibitor E | | 1.3 | 1.3 | 1.3 | 1.3 | 1.3 | 1.3 | 1.3 | 1.3 | 1.3 | 1.3 | 1.3 | 1.3 | 1.3 | 1.3 | 1.3 |
| Lubricant F | F-1 | 0.7 | 0.7 | 0.7 | — | — | — | — | — | — | 0.7 | — | — | — | — | — |
| | F-2 | — | — | — | 0.7 | 0.7 | 0.7 | 0.7 | 0.7 | 0.7 | — | 0.7 | 0.7 | 0.7 | 0.7 | 0.7 |
| Plasticizer G | | — | — | — | — | — | — | — | — | — | — | — | G-1 5 | — | G-2 5 | G-3 5 |
| Filler H | | 65 | 80 | 80 | 80 | 80 | 80 | 80 | 65 | 50 | 80 | 80 | 80 | 80 | 80 | 80 |
| UL94 Flame retardancy | | V-0 | V-0 | V-0 | V-0 | V-0 | V-0 | V-0 | V-0 | V-0 | V-0 | V-0 | V-0 | V-0 | V-0 | V-0 |
| Blooming property | | A | A | A | A | A | A | A | A | A | A | A | A | A | A | A |

TABLE 2

| | | Comparative Examples | | | | | | | |
|---|---|---|---|---|---|---|---|---|---|
| | | 1 | 2 | 3 | 4 | 5 | 6 | 7 | 8 |
| Base resin R | R-1 | 50 | 50 | 50 | 50 | — | — | — | — |
| | R-2 | 50 | 50 | 50 | 50 | 100 | 100 | 100 | 100 |
| Flame retardant A | A-1 | — | 40 | — | — | — | 40 | — | — |
| | A-3 | — | — | — | 40 | — | — | — | 40 |
| Flame-retardant auxiliary B | | — | — | B2-1 40 | B2-1 40 | — | — | B2-1 40 | B2-1 40 |
| Antioxidant C | | 0.7 | 0.7 | 0.7 | 0.7 | 0.7 | 0.7 | 0.7 | 0.7 |
| Stabilizer D | | D1-2 0.5 | D1-2 0.5 | D1-2 0.5 | D1-2 0.5 | D1-2 0.5 | D1-2 0.5 | D1-2 0.5 | D1-2 0.5 |
| Dripping inhibitor E | | 1.3 | 1.3 | 1.3 | — | 1.3 | 1.3 | 1.3 | — |
| Lubricant F | F-2 | 0.7 | 0.7 | 0.7 | 0.7 | 0.7 | 0.7 | 0.7 | 0.7 |
| Plasticizer G | | — | — | — | — | — | — | — | — |
| Filler H | | 80 | 80 | 80 | 80 | 80 | 80 | 80 | 80 |
| UL94 Flame retardancy | | HB | HB | HB | V-2 | HB | HB | HB | V-2 |
| Blooming property | | A | A | A | B | A | A | A | B |

TABLE 3

| | | Examples | | | | | | | | | | | | | |
|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 |
| Base resin R | R-1 | 100 | 100 | 80 | 70 | 50 | 50 | 60 | 50 | 50 | 50 | 50 | 50 | 50 | 50 |
| | R-2 | — | — | 20 | 30 | 50 | 50 | 40 | 50 | 50 | 50 | 50 | 50 | 50 | 50 |
| | R-3 | — | — | — | — | — | — | — | — | — | — | — | — | — | — |
| | R-4 | — | — | — | — | — | — | — | — | — | — | — | — | — | — |
| Flame retardant A | | A-1 15 | A-1 25 | A-2 25 | A-1 100 | A-1 85 | A-1 85 | A-1 85 | A-1 80 | A-1 85 | A-1 85 | A-1 85 | A-1 85 | A-1 80 | A-1 80 |
| Flame-retardant auxiliary B | | B1-2 0.5 | B1-3 0.5 | B1-3 0.5 | B1-3 1.0 | B1-1 0.5 | B1-2 2.5 | B1-3 2.5 | B1-3 5.0 | B2-1 2.5 | B2-2 2.5 | B3-1 2.5 | B4-1 2.5 | B1-3 2.5 B2-1 2.5 | B1-3 2.5 B4-1 2.5 |
| Antioxidant C | | 0.5 | 0.5 | 0.5 | 0.5 | 0.5 | 0.5 | 0.5 | 0.5 | 0.5 | 0.5 | 0.5 | 0.5 | 0.5 | 0.5 |
| Stabilizer D | D-1 | — | — | D1-1 0.5 | D1-2 0.5 | D1-1 0.5 | D1-1 0.5 | D1-1 0.5 | D1-1 0.5 | D1-1 0.5 | D1-1 0.5 | D1-1 0.5 | D1-1 0.5 | D1-1 0.5 | D1-1 0.5 |
| | D-2 | — | — | — | — | — | — | — | — | — | — | — | — | — | — |
| | D-3 | — | — | — | — | — | — | — | — | — | — | — | — | — | — |
| Dripping inhibitor E | | — | — | — | 1.0 | 1.0 | 1.0 | 1.0 | 1.0 | 1.0 | 1.0 | 1.0 | 1.0 | 1.0 | 1.0 |
| Lubricant F | F-1 | — | — | — | 0.7 | — | — | — | — | — | — | — | — | — | — |
| | F-2 | — | — | — | — | 0.7 | 0.7 | 0.7 | 0.7 | 0.7 | 0.7 | 0.7 | 0.7 | 0.7 | 0.7 |
| Plasticizer G | | — | — | — | — | — | — | — | — | — | — | — | — | — | — |
| Filler H | | — | — | — | 50 | 60 | 60 | 60 | 45 | 60 | 60 | 60 | 60 | 60 | 60 |
| UL94 Flame retardancy | | V-2 | V-2 | V-2 | V-0 | V-0 | V-0 | V-0 | V-0 | V-0 | V-0 | V-0 | V-0 | V-0 | V-0 |
| Blooming property | | A | A | A | A | A | A | A | A | A | A | A | A | A | A |
| Comparative tracking index (V) | | >600 | >600 | >600 | 450 | 450 | 450 | 450 | 500 | 450 | 450 | 450 | 450 | 450 | 450 |

TABLE 4

| | | Examples | | | | | | Comparative Examples | | | | | | | | |
|---|---|---|---|---|---|---|---|---|---|---|---|---|---|---|---|---|
| | | 30 | 31 | 32 | 33 | 34 | 35 | 9 | 10 | 11 | 12 | 13 | 14 | 15 | 16 | 17 |
| Base resin R | R-1 | 50 | 50 | 50 | — | — | — | 100 | 100 | 50 | 60 | 50 | 50 | 50 | 50 | 50 |
| | R-2 | 50 | 50 | 50 | 100 | 100 | 50 | — | — | 50 | 40 | 50 | 50 | 50 | 50 | 50 |
| | R-3 | — | — | — | — | — | — | — | — | — | — | — | — | — | — | — |
| | R-4 | — | — | — | — | — | 50 | — | — | — | — | — | — | — | — | — |
| Flame retardant A | | A-1 85 | A-2 85 | A-4 85 | A-1 75 | A-1 85 | A-1 85 | — | — | — | — | — | — | — | — | — |
| Flame-retardant auxiliary B | | B1-3 2.5 | B1-3 5.0 | B1-3 2.5 | B1-3 2.5 | B1-3 5.0 | B1-3 2.5 | — | B1-2 0.5 | — | B1-1 2.5 | B1-2 2.5 | B1-3 2.5 | B2-1 2.5 | B3-1 2.5 | B4-1 2.5 |
| Antioxidant C | | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Stabilizer D | D-1 | D1-1 0.5 | D1-1 0.5 | D1-1 0.5 | D1-1 0.5 | D1-2 0.5 | D1-1 0.5 | — | — | — | — | — | — | — | — | — |
| | D-2 | D2-2 1.5 | — | — | — | — | — | — | — | — | — | — | — | — | — | — |
| | D-3 | 2.5 | — | — | — | — | — | — | — | — | — | — | — | — | — | — |

TABLE 4-continued

|  |  | Examples | | | | | | Comparative Examples | | | | | | | | |
| --- | --- | --- | --- | --- | --- | --- | --- | --- | --- | --- | --- | --- | --- | --- | --- | --- |
|  |  | 30 | 31 | 32 | 33 | 34 | 35 | 9 | 10 | 11 | 12 | 13 | 14 | 15 | 16 | 17 |
| Dripping inhibitor E | | 1.0 | 1.0 | 1.0 | 1.0 | 1.0 | 1.0 | — | — | — | — | — | — | — | — | — |
| Lubricant F | F-1 | — | — | — | — | — | — | — | — | — | — | — | — | — | — | — |
|  | F-2 | 0.7 | 0.7 | 0.7 | 0.7 | 0.7 | 0.7 | — | — | 0.7 | 0.7 | 0.7 | 0.7 | 0.7 | 0.7 | 0.7 |
| Plasticizer G | | — | — | — | — | G-2 5.0 | — | — | — | — | — | — | — | — | — | — |
| Filler H | | 60 | 60 | 60 | 60 | 50 | 60 | — | — | 60 | 60 | 60 | 60 | 60 | 60 | 60 |
| UL94 Flame retardancy | | V-0 | V-0 | V-1 | V-0 | V-0 | V-0 | HB | HB | HB | HB | HB | HB | HB | HB | HB |
| Blooming property | | A | A | A | A | A | A | A | A | A | A | A | A | A | A | A |
| Comparative tracking index (V) | | 450 | 450 | 400 | 400 | 400 | 450 | >600 | >600 | >600 | >600 | >600 | >600 | >600 | >600 | >600 |

The invention claimed is:

1. A flame-retardant resin composition, which comprises (R) a base resin, (A) a flame retardant and (B) a flame-retardant auxiliary, wherein the flame retardant (A) comprises a salt of (A1) an amino group-containing triazine compound with (A2) at least one member selected from the group consisting of a sulfuric acid and a sulfonic acid, and the flame-retardant auxiliary (B) comprises at least one member selected from the group consisting of (B1) an aromatic resin, (B2) a cyclic urea-series compound or a derivative thereof, (B3) an amino group-containing triazine compound and (B4) at least one inorganic metal-series compound selected from the group consisting of metal borates, metal hydrogen phosphates, metal stannates, metal molybdates, metal tungstates and metal sulfides.

2. A resin composition according to claim 1, wherein the base resin (R) comprises (i) a polyester-series resin, or (ii) a polyester-series resin and a polystyrenic resin.

3. A resin composition according to claim 1, wherein the base resin (R) comprises a homo- or copolyester having at least one unit selected from the group consisting of 1,4-cyclohexanedimethylene terephthalate, a $C_{2-4}$alkylene terephthalate, and a $C_{2-4}$alkylene naphthalate.

4. A resin composition according to claim 1, wherein the base resin (R) comprises at least one member selected from the group consisting of a polyethylene terephthalate, a polypropylene terephthalate, a polybutylene terephthalate, and an isophthalic acid-modified polybutylene terephthalate.

5. A resin composition according to claim 1, wherein the base resin (R) comprises a mixture of a first resin and a second resin, the first resin is selected from the group consisting of a poly$C_{3-4}$alkylene terephthalate, the second resin is a polyethylene terephthalate or a polybutylene terephthalate and is different from the first resin, and the mixture is (i) a mixture of a polybutylene terephthalate and a polyethylene terephthalate, (ii) a mixture of a polypropylene terephthalate and a polyethylene terephthalate, or (iii) a mixture of a polypropylene terephthalate and a polybutylene terephthalate.

6. A resin composition according to claim 1, wherein the base resin (R) is a mixture of a polybutylene terephthalate and a polyethylene terephthalate, or a mixture of a polypropylene terephthalate and a polyethylene terephthalate.

7. A resin composition according to claim 5, wherein the proportion of the first resin relative to the second resin [the first resin/the second resin] is 20/80 to 80/20 in a weight ratio.

8. A resin composition according to claim 1, wherein the amino group-containing triazine compound (A1) in the flame retardant (A) comprises melamine or a melamine condensate.

9. A resin composition according to claim 1, wherein the proportion of the amino group-containing triazine compound (A1) relative to the total amount of the sulfuric acid and the sulfonic acid (A2) in the flame retardant (A) is 1/5 to 5/1 in a molar ratio.

10. A resin composition according to claim 1, wherein the salt of the amino group-containing triazine compound with at least one member selected from the group consisting of the sulfuric acid and the sulfonic acid has a weight decrease of not larger than 15% by weight when the salt is heated with increasing a temperature from 30 to 250° C. at an increasing rate of 20° C. per minute under a nitrogen flow.

11. A resin composition according to claim 1, wherein the aromatic resin (B1) comprises at least one member selected from the group consisting of a resin containing an aromatic ring having a hydroxyl group and/or an amino group, a polyarylate-series resin, an aromatic epoxy resin, an aromatic nylon, a polyphenylene sulfide-series resin, a polyphenylene oxide-series resin, and a polycarbonate-series resin.

12. A resin composition according to claim 1, wherein the cyclic urea-series compound or a derivative thereof (B2) comprises at least one member selected from the group consisting of a cyclic ureide, and a salt of a cyclic ureide with a melamine.

13. A resin composition according to claim 1, wherein the amino group-containing triazine compound (B3) comprises at least one member selected from the group consisting of melamine or a derivative thereof and guanamine or a derivative thereof.

14. A resin composition according to claim 1, wherein the inorganic metal-series compound (B4) comprises at least one member selected from the group consisting of a metal salt of an oxygen acid having no sulfur atom, a metal oxide, a metal hydroxide and a metal sulfide.

15. A resin composition according to claim 1, wherein the proportion of the flame retardant (A) relative to the flame-retardant auxiliary (B) is 99.99/0.01 to 1/99 in a weight ratio.

16. A resin composition according to claim 1, wherein the base resin (R) comprises at least a polyester-series resin, the flame retardant (A) comprises a salt of at least one amino group-containing triazine compound selected from the group consisting of melamine and a condensate thereof with at least one member selected from the group consisting of the sulfuric acid and the sulfonic acid, and the flame-retardant auxiliary (B) comprises the aromatic resin (B1).

17. A resin composition according to claim 1, wherein the base resin (R) comprises at least (i) a polyethylene terephthalate, (ii) a polybutylene terephthalate, (iii) a mixture of a polypropylene terephthalate and a polyethylene terephthalate, or (iv) a mixture of a polybutylene terephthalate and a polyethylene terephthalate, the flame retardant (A) comprises a salt of at least one aminotriazine compound selected from the group consisting of melamine and a condensate thereof with at least one member selected from the group consisting of the sulfuric acid and an alkanesulfonic acid, and the flame-retardant auxiliary (B) comprises an aromatic epoxy resin.

18. A resin composition according to claim 1, wherein the base resin (R) comprises a mixture of a first resin and a second resin, the first resin is a polybutylene terephthalate or a polypropylene terephthalate, the second resin is a polyethylene terephthalate, the proportion of the first resin relative to the second resin [the first resin/the second resin] is 30/70 to 80/20 in a weight ratio.

19. A resin composition according to claim 16 or 17, wherein the flame retardant (A) is 10 to 120 parts by weight and the flame-retardant auxiliary (B) is 0.001 to 5 parts by weight, relative to 100 parts by weight of the base resin (R).

20. A resin composition according to claim 16, wherein the proportion of the flame retardant (A) relative to the aromatic resin (B1) is 99.99/0.01 to 20/80 in a weight ratio.

21. A resin composition according to claim 1, wherein the base resin (R) comprises at least an aromatic polyester-series resin, the flame retardant (A) comprises a salt of at least one amino group-containing triazine compound selected from the group consisting of melamine and a condensate thereof with at least one member selected from the group consisting of the sulfuric acid and the sulfonic acid, and the flame-retardant auxiliary (B) comprises at least one member selected from the group consisting of acetyleneurea, uric acid, a salt of a melamine or a condensate thereof with cyanuric acid, and melamine or a condensate thereof, wherein, in the flame retardant (A) and the flame-retardant auxiliary (B), the melamine condensate is at least one member selected from the group consisting of melam, melem and melon.

22. A resin composition according to claim 1, which further comprises at least one component selected from the group consisting of an antioxidant, a stabilizer, a dripping inhibitor, a lubricant, a plasticizer and a filler.

23. A resin composition according to claim 1, which further comprises an antioxidant in a proportion of 0.01 to 3 parts by weight relative to 100 parts by weight of the base resin (R).

24. A resin composition according to claim 1, which further comprises a stabilizer in a proportion of 0.01 to 10 parts by weight relative to 100 parts by weight of the base resin (R).

25. A resin composition according to claim 16, which further comprises a dripping inhibitor in a proportion of 0.01 to 5 parts by weight relative to 100 parts by weight of the base resin (R).

26. A resin composition according to claim 16 which further comprises a lubricant in a proportion of 0.01 to 2 parts by weight relative to 100 parts by weight of the base resin (R).

27. A resin composition according to claim 1 or 16, which further comprises a plasticizer in a proportion of 0.01 to 20 parts by weight relative to 100 parts by weight of the base resin (R).

28. A resin composition according to claim 1 or 16, which further comprises a filler in a proportion of 0.1 to 100 parts by weight relative to 100 parts by weight of the base resin (R).

29. A process for producing a flame-retardant resin composition, which comprises mixing (R) a base resin, (A) a flame retardant recited in claim 1, and (B) a flame-retardant auxiliary recited in claim 1.

30. A shaped article formed from a flame-retardant resin composition recited in claim 1.

31. A shaped article according to claim 30, which has, as an electrical property, a comparative tracking index of not less than 300 V, and has, as a flame retardancy, a flame-retardant performance of V-2, V-1 or V-0 in a flame retardancy test measured by using a test piece having a thickness of 0.8 mm in accordance with UL94.

32. A shaped article according to claim 30, which has, as an electrical property a comparative tracking index of not less than 350 V, and has, as a flame retardancy, a flame-retardant performance of V-0 in a flame retardancy test measured by using a test piece having a thickness of 0.8 mm in accordance with UL94.

33. A shaped article according to claim 30, which is an electric or electronic device part, an office automation device part, an automotive part, or a mechanical part or machine element.

34. A shaped article according to claim 30, which is a connector part, a switch part, a relay part, a transformer part, a breaker part, an electromagnetic switch device part, a focus case part, a capacitor part, a motor part, a copying machine part, or a printer part.

35. A process for producing a shaped article, which comprises injection-molding a flame-retardant resin composition containing (R) a base resin, (A) a flame retardant recited in claim 1 and (B) a flame-retardant auxiliary recited in claim 1.

* * * * *